US008707386B2

(12) United States Patent
Igakura

(10) Patent No.: US 8,707,386 B2
(45) Date of Patent: Apr. 22, 2014

(54) POLICY PROCESSING SYSTEM, METHOD, AND PROGRAM

(75) Inventor: Tomohiro Igakura, Tokyo (JP)

(73) Assignee: NEC Corporation, Tokyo (JP)

( * ) Notice: Subject to any disclaimer, the term of this patent is extended or adjusted under 35 U.S.C. 154(b) by 1490 days.

(21) Appl. No.: 12/088,274

(22) PCT Filed: Sep. 27, 2006

(86) PCT No.: PCT/JP2006/319166
§ 371 (c)(1),
(2), (4) Date: Mar. 27, 2008

(87) PCT Pub. No.: WO2007/037266
PCT Pub. Date: Apr. 5, 2007

(65) Prior Publication Data
US 2009/0260051 A1 Oct. 15, 2009

(30) Foreign Application Priority Data

Sep. 27, 2005 (JP) ................................ 2005-279597

(51) Int. Cl.
*H04L 29/06* (2006.01)
(52) U.S. Cl.
USPC .......................................................... 726/1
(58) Field of Classification Search
USPC .......................................................... 726/1
See application file for complete search history.

(56) References Cited

U.S. PATENT DOCUMENTS

| 5,423,000 | A * | 6/1995 | Kimura et al. ..................... 713/1 |
| 6,530,024 | B1 * | 3/2003 | Proctor ........................... 726/23 |
| 7,058,824 | B2 * | 6/2006 | Plante et al. .................. 713/300 |
| 7,143,439 | B2 * | 11/2006 | Cooper et al. .................. 726/11 |
| 7,296,089 | B2 * | 11/2007 | Krishnamurthy et al. .... 709/238 |
| 7,380,267 | B2 * | 5/2008 | Arai et al. .......................... 726/1 |
| 7,546,629 | B2 * | 6/2009 | Albert et al. ....................... 726/1 |
| 7,591,002 | B2 * | 9/2009 | Shelest et al. ..................... 726/1 |
| 8,065,719 | B2 * | 11/2011 | Yang ................................ 726/11 |
| 2002/0184568 | A1 * | 12/2002 | Kurrasch ......................... 714/39 |
| 2004/0098289 | A1 * | 5/2004 | Sugimori .......................... 705/7 |

(Continued)

FOREIGN PATENT DOCUMENTS

| JP | 7175668 A | 7/1995 |
| JP | 2510696 B2 | 4/1996 |
| JP | 2005234661 A | 9/2005 |
| WO | 2005/013034 A2 | 2/2005 |

OTHER PUBLICATIONS

Fuchsberger et al. "Intrusion Detection Systems and Intrusion Prevention Systems" Information Security Technical Report, Elsevier Advanced Technology, vol. 10, No. 3, Jan. 1, 2005, pp. 134-139 XP 005134957.

*Primary Examiner* — David Garcia Cervetti
(74) *Attorney, Agent, or Firm* — Sughrue Mion, PLLC

(57) ABSTRACT

In a policy handling system performing automatic execution, management, and control of a system, a policy retrieving section (102) retrieves a policy associated with a triggering condition, and notifies a policy-execution-pattern analyzing section (105) of the retrieved policy. A policy-operation-log retrieving section (106) refers to a policy-operation-log storage section (107) to acquire the number of triggering times of the retrieved policy in a predetermined history acquisition period. The policy-execution-pattern analyzing section (105) compares the number of triggering times of the retrieved policy against a predetermined threshold and causes an abnormality notifying section (108) to issue abnormality information when the number of triggering times exceeds the threshold.

35 Claims, 31 Drawing Sheets

(56) References Cited

U.S. PATENT DOCUMENTS

| | | | |
|---|---|---|---|
| 2004/0193606 A1* | 9/2004 | Arai et al. | 707/9 |
| 2004/0205689 A1* | 10/2004 | Ellens et al. | 717/100 |
| 2005/0027837 A1* | 2/2005 | Roese et al. | 709/223 |
| 2005/0138111 A1* | 6/2005 | Aton et al. | 709/201 |
| 2006/0282876 A1* | 12/2006 | Shelest et al. | 726/1 |

* cited by examiner

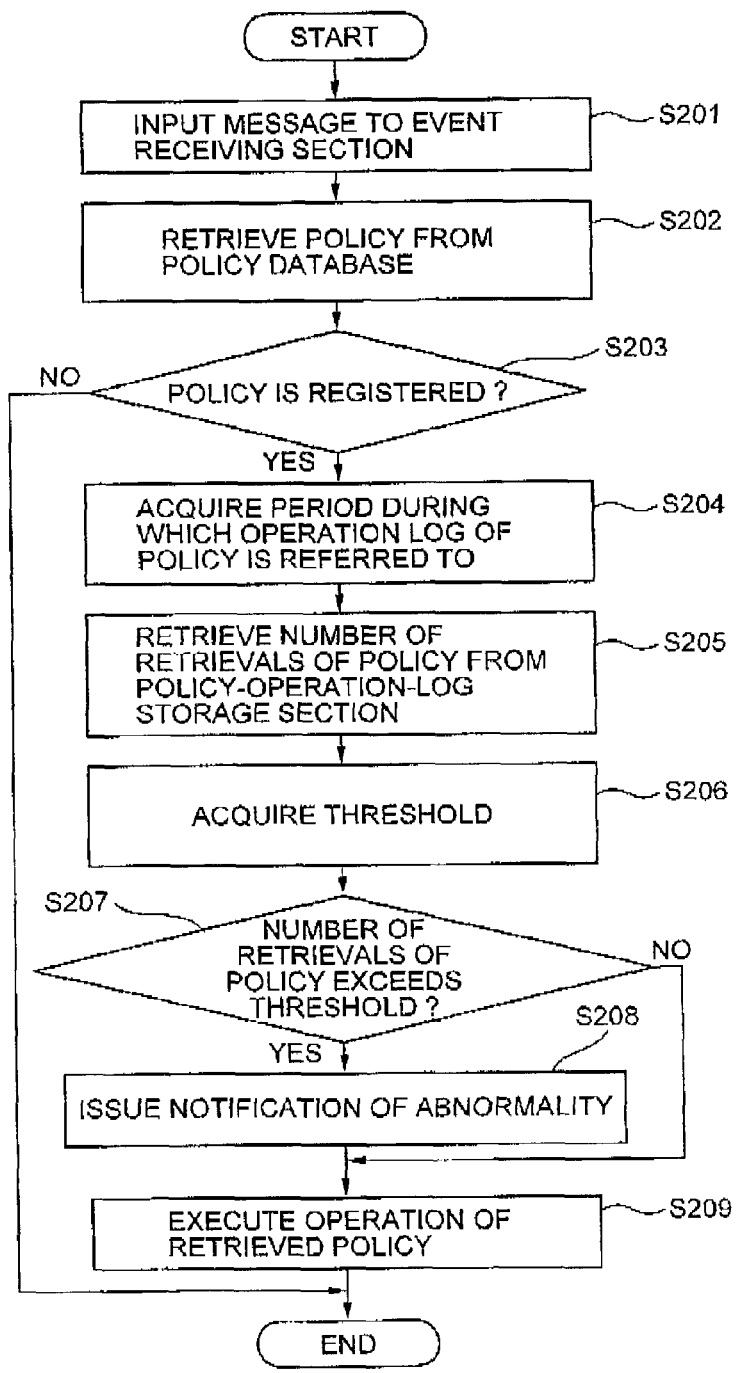

FIG. 3

| POLICY ID | TRIGGERING CONDITION | OPERATION TRIGGERED |
|---|---|---|
| policyA | server="serverB", cpuload>0.9 | TO CREATE MIRROR SERVER OF SERVER B |
| ResetAt22 | time=22:00 | TO STOP SERVICE A |
| policyC | server="serverC", cpuload>0.9 | TO CREATE MIRROR SERVER OF SERVER C |

FIG. 4

| POLICY ID | TRIGGERING TIME (MONTH : DAY : HOUR : MINUTE : SECOND) |
|---|---|
| ResetAt22 | 03:21:22:00:02 |
| policyA | 03:21:22:01:22 |
| policyA | 03:21:22:01:55 |
| policyC | 03:21:22:01:58 |
| policyC | 03:21:22:02:03 |
| policyA | 03:21:22:02:08 |
| policyC | 03:21:22:02:10 |
| policyC | 03:21:22:02:12 |
| policyC | 03:21:22:02:15 |
| policyA | 03:21:22:02:19 |
| policyC | 03:21:22:02:22 |

| POLICY ID | HISTORY ACQUISITION PERIOD |
|---|---|
| policyA | 40 |
| ResetAt22 | 60 |
| policyC | 20 |

| POLICY ID | POLICY-TRIGGERING-COUNT THRESHOLD |
|---|---|
| policyA | 2 |
| ResetAt22 | 4 |
| policyC | 6 |

FIG. 17

| POLICY ID | TRIGGERING CONDITION | TRIGGERED OPERATION |
|---|---|---|
| policyE | server=*, bandwidth>80 | TO CREATE MIRROR SERVER OF (SERVER) |
| policyF | server="serverF", diskspace<10 | TO BACKUP SERVER F |
| policyG | server="serverF", diskwritesum>500 | TO BACKUP SERVER F |

FIG. 18

| POLICY ID | TRIGGERING TIME (MONTH : DAY : HOUR : MINUTE : SECOND) | PARAMETER |
|---|---|---|
| policyE | 03:21:22:01:50 | server=serverA |
| policyF | 03:21:22:01:52 | |
| policyE | 03:21:22:01:55 | server=serverB |
| policyG | 03:21:22:01:58 | |
| policyE | 03:21:22:02:03 | server=serverA |
| policyF | 03:21:22:02:08 | |
| policyE | 03:21:22:02:10 | server=serverC |
| policyG | 03:21:22:02:12 | |
| policyF | 03:21:22:02:15 | |
| policyE | 03:21:22:02:19 | server=serverB |
| policyE | 03:21:22:02:22 | server=serverA |
| policyF | 03:21:22:02:23 | |

FIG. 21

| POLICY ID | TRIGGERING CONDITION | TRIGGERED OPERATION | FLAG |
|---|---|---|---|
| policyA | server="serverB", cpuload>0.9 | TO CREATE MIRROR SERVER OF SERVER B | O |
| policyC | server="serverC", cpuload>0.9 | TO CREATE MIRROR SERVER OF SERVER C | O |
| policyH | server=*, programstart="service1" | STORE TRIGGERING TIME AND USER IN OPERATION LOG | × |

FIG. 24

| POLICY ID | TRIGGERING CONDITION | TRIGGERED OPERATION |
|---|---|---|
| policyI | server="serverA", state=no_responce | TO RESTART SERVER A |
| policyJ | server="serverB", state=no_responce | TO RESTART SERVER B |

FIG. 25

| POLICY ID | TRIGGERING CONDITION | TRIGGERED OPERATION |
|---|---|---|
| policyK | server="serverA", cpuload>0.9 | TO CREATE MIRROR SERVER OF SERVER A |
| policyM | server="serverC", diskwritesum>500 | TO BACKUP SERVER C |

FIG. 26

| POLICY ID | TRIGGERING CONDITION | TRIGGERED OPERATION |
|---|---|---|
| policyL | server="serverB", cpuload>0.9 | TO RESTART SERVER B |
| policyN | server="serverD", diskwritesum>500 | TO BACKUP SERVER D |

FIG. 27

| POLICY ID | TRIGGERING TIME (MONTH : DAY : HOUR : MINUTE : SECOND) |
|---|---|
| policyI | 03:21:22:01:52 |
| policyJ | 03:21:22:01:55 |
| policyN | 03:21:22:01:58 |
| policyM | 03:21:22:02:03 |
| policyJ | 03:21:22:02:08 |
| policyK | 03:21:22:02:10 |
| policyL | 03:21:22:02:12 |
| policyI | 03:21:22:02:15 |
| policyM | 03:21:22:02:19 |
| policyK | 03:21:22:02:22 |

FIG. 32

| POLICY ID | TRIGGERING CONDITION | TRIGGERED OPERATION |
|---|---|---|
| policyO | server="serverA", cpuload>0.9 | TO CREATE MIRROR SERVER OF SERVER A |
| policyP | server=*, diskspace<10 | TO BACKUP (SERVER) |

FIG. 33

| POLICY ID | EXECUTION FREQUENCY | LATEST EXECUTION TIME |
|---|---|---|
| policyO | 52 | 03:21:11:26:51 |
| policyP | 22 | 03:21:11:26:50 |

FIG. 34

| POLICY ID | ESTIMATED EXECUTION TIME (MONTH : DAY : HOUR : MINUTE : SECOND) |
|---|---|
| policyO | 03:21:11:27:41 |
| policyP | 03:21:11:28:12 |
| policyO | 03:21:11:28:32 |

POLICY PROCESSING SYSTEM, METHOD, AND PROGRAM

TECHNICAL FIELD

The present invention relates to a policy handling system, method, and program and, more particularly, to a policy handling system, method, and program for performing automatic execution, management, and control of a system by using a policy that describes system management rules.

BACKGROUND ART

There has been developed a system that automatically performs management and the like of the system by using a policy that describes rules for system management so as to reduce the management costs and respond to an abnormality. Typically, a policy includes a triggering condition and a triggered operation. When a given event is generated inside or outside of a management-targeted system, a policy handling system that handles policies retrieves a policy having a triggering condition which is satisfied by the generated event and executes the triggered operation of the retrieved policy.

Assuming that the policy is appropriately set, the policy handling system can achieve autonomous and automatic management for the management-targeted system by executing the operation of the policy. However, an inappropriate setting of the policy may not only prevent autonomous processing from being properly executed but also cause an abnormality in the management-targeted system. Further, if a consistency between policies is not achieved even if each single policy is appropriately set, an abnormality may be caused in the management-targeted system by interaction between the policies. Therefore, during performing the system management using the policy, it is necessary to monitor whether or not a failure is caused by each policy or interaction between the policies.

Examples of the known technique for detecting an error of policy setting, or inconsistency or contradiction between the policies include one described in JP2004-303190A. FIG. 39 shows the configuration of an information processing apparatus (policy handling system) 500 described in this Patent Document 1. The technique described in this publication uses a policy database 504 for storing normal policies and a global-policy database 507 for storing upper-level policies (global policies) specifying events or the like that are not allowed to occur.

The policy database 504 stores therein a normal policy including a condition and an operation specifying, e.g., "to backup files of server A at 3:00 AM". A policy retrieving section 502 retrieves a policy having triggering condition which is satisfied by an event received by an event receiving section 501 and passes the retrieved policy to an operation executing section 503. The operation executing section 503 executes the operation specified in the policy for a management-targeted system.

The global-policy database 507 stores therein a global policy imposing restrictions on the operation of the policy, such as "plurality of backups are not allowed to be created simultaneously on one tape device". A global-policy comparison section 506 checks whether or not a policy stored in the policy database 504 conflicts with a global policy stored in the global-policy database 507. A policy correcting section 505 corrects the policy conflicting with the global policy so as not to conflict with the global policy.

It is assumed that, for example, the policy database 504 stores therein policies specifying "to backup files of server A at 3:00 AM" and "to back up files of server B at 3:00 AM". In this case, each policy itself does not have any problem. However, when considering that the operation executing section 503 executes the above policies, which means that the operation executing section 503 simultaneously executes backups of files of servers A and B at 3:00 AM, it is found that the policies conflict with the global policy specifying "plurality of backups are not allowed to be created simultaneously on one tape device". The policy correcting section 505 modifies, e.g., the content of the policy "to back up files of server B at 3:00 AM" into "to back up files of server B at 2:00 AM".

In the technique described in the above publication, the policy correcting section 505 automatically corrects the parameter of the policy conflicting with the global policy. Thus, the operation described in the policy allows autonomous processing to operate normally. As described above, in the technique described in the above publication, it is possible to prevent execution of a policy conflicting with the global policy, thereby achieving autonomous and automatic management for a management-targeted system.

However, in the technique described in the above publication, the policy is analyzed, at the time of registration thereof, whether or not the policy conflicts with the global policy according to the global policy stored in the global-policy database 507. Therefore, it is impossible to cope with a situation in which the policy causes a chain of troubles in association with the management-targeted system, such as occurring due to the system operation or unexpected change in the state of policies, which cannot be grasped only from the described policies. For example, it is impossible to cope with the situation in which, if one resource is dynamically assigned to a service of a heavier load, two services scramble for the one resource to cause the one resource to alternate between the services.

In order to detect and solve the problems involved with the policy operation, it is necessary to monitor the actual operating state of the policy. However, in the technique of Patent Document 1, the operating state of the policy is not monitored after the triggering of the policy. Thus, it is impossible to detect a negative spiral in which an unintended change occurs in the system state by the policy operation due to the inconsistency between the system operation and the policy description or between the descriptions of a plurality of policies, then the unintended change triggers the same policy once again, and the thus triggered policy worsens the system state.

Further, in the technique described in the above publication, there is provided no mechanism for responding to a failure caused by the triggering of the policy in real time so as to minimize the spread of the failure. Therefore, the failure may spread while a human is considering a countermeasure for the failure if human judgment is required for determining whether or not the management-targeted system should be stopped. Thus, even if an abnormal policy which seems to cause the negative spiral can be detected, an administrator cannot afford to stop the system because the policy operation is automatically executed at a high speed, with the result that it is impossible to prevent the spread of failure.

DISCLOSURE OF THE INVENTION

An object of the present invention is to provide a policy handling system, method, and program which are capable of detecting a chain of errors which is not intended by a policy programmer to detect that the management-targeted system is abnormal and/or unstable due to the influence of an inadequate policy.

Another object of the present invention is to provide a policy handling system, method, and program which are capable of minimizing adverse affect by an abnormal policy operation on the management-targeted system at the time when the abnormal policy operation is detected.

The present invention provides, in a first aspect thereof, a policy handling system for managing a management-targeted system based on a policy in which a triggering condition for triggering the policy and operation to be executed are associated with each other, including an abnormality detecting unit which includes: a policy-operation-log retrieving section that receives a notification of a policy having a triggering condition which is satisfied, and refers to a policy-operation-log storage section storing an operation history of policies, to acquire a triggered frequency in a time period before receiving the notification with regard to the policy having the triggering condition which is satisfied; and a policy-execution-pattern analyzing section that determines whether or not the policy is abnormal based on the triggered frequency of the policy acquired by the policy-operation-log retrieving section.

When a policy is used to manage a management-targeted system (device), and if an abnormality occurs in the policy, the management of the management-targeted system cannot be performed properly, with the result that the management-targeted system shifts to abnormal and/or unstable state. Even if there is no problem in the description itself of the policy, the abnormality in the policy may occur when the policy is actually applied to the management of the management-targeted system. Further, the abnormality may occur due to coalition of different policies. The policy handling system according to the present invention refers to the operation log of a policy to check the triggered frequency of the policy and detects an abnormality in the policy based on the triggered frequency. By monitoring the operation state of a policy and detecting abnormal behavior of the policy based on the triggered frequency thereof as described above, it is possible to detect a chain of errors which is not intended by a policy programmer to prevent the system from shifting to an abnormal and/or unstable state due to an inadequate policy or policies.

In the policy handling system of the present invention, a configuration may be employed wherein the policy-operation-log retrieving section acquires the number of triggering times of the policy during a history acquisition period before receiving the notification, and the policy-execution-pattern analyzing section determines that the policy is abnormal when the number of triggering times of the policy during the history acquisition period exceeds a predetermined threshold. In this case, the policy handling system can judge the abnormality of the policy based on the number of triggering times (situation of the triggering) of the policy during the history acquisition period.

In the policy handling system of the present invention, a configuration may be employed wherein the policy-operation-log retrieving section includes a history-acquisition-period acquisition section that refers to a history-acquisition-period storage section storing a policy and a history acquisition period in association with each other, to acquire the history acquisition period of the policy having the triggering condition which is satisfied. In this case, the history acquisition period can be determined for each policy, whereby the abnormality detection of the policy can be performed depending on the history acquisition period.

In the policy handling system of the present invention, a configuration may be employed wherein the policy-operation-log retrieving section includes a history-acquisition-period calculation section that calculates average and variance of at least one of past triggered frequency and triggering time interval, to calculate the history acquisition period based on the calculated average and variance, and stores the obtained history acquisition period in the history-acquisition-period storage section. In this case, the history acquisition period can be dynamically obtained based on the situation of the triggering of the policy.

In the policy handling system of the present invention, a configuration may be employed wherein the policy-execution-pattern analyzing section includes a policy-triggering-count-threshold acquisition section that refers to a policy-triggering-count-threshold storage section storing a policy and a threshold in association with each other, to acquire the threshold. In this case, the threshold can be set for each policy, whereby the abnormality of the policy can be detected depending on the threshold for the policy.

In the policy handling system of the present invention, a configuration may be employed wherein the policy-execution-pattern analyzing section includes a policy-triggering-count-threshold calculation section that calculates the average and variance of the number of triggering times of the policy during a specific period, calculates the threshold based on the calculated average and variance, and stores the calculated threshold in the policy-triggering-count-threshold storage section. In this case, the threshold can be dynamically determined depending on the situation of triggering.

In the policy handling system of the present invention, a configuration may be employed wherein the policy-operation-log retrieving section includes a policy-approximation-degree evaluating section that determines the degree of approximation between policies based on at least one of the triggering condition and operation to be executed, and the policy-approximation-degree evaluating section regards a policy determined to be approximating the policy having a triggering condition which is satisfied as the same as the policy having the triggering condition which is satisfied, acquires, from the policy-operation-log storage section, the number of triggering times of the policy determined to be approximating the policy having the triggering condition which is satisfied. In this case, a policy having a higher approximation degree is regarded as the same policy, whereby a chain of triggering of the approximating policies can be detected.

In the policy handling system of the present invention, a configuration may be employed wherein the policy-execution-pattern analyzing section includes a policy-flag evaluating section that refers to a policy flag table storing a policy and an influence-degree flag indicating whether or not policy-operation-abnormality determination processing needs to be performed for the policy, to determine whether or not the policy having the triggering condition which is satisfied is abnormal. In this case, by setting the influence degree flag of a specific policy so that the specific policy does not need the policy-operation-abnormality determination processing, determination of whether or not the policy is abnormal can be omitted for the specific policy, such as log storage processing during the triggering, which does not cause an abnormality.

In the policy handling system of the present invention, a configuration may be employed wherein the policy handling system further includes a policy executing unit that includes: an event monitoring section that monitors an event generated in a management-targeted system; a policy retrieving section that refers to a policy database storing the policy when the event monitoring section detects occurrence of an event corresponding to the triggering condition to retrieve a policy having the triggering condition which is satisfied and notifies the policy-operation-log retrieving section of the retrieved policy; and an operation executing section that executes operation of the policy retrieved by the policy retrieving section. The policy handling system may be the same unit as the policy abnormality detecting unit. In an alternative, the policy handling system may be separately provided from the policy abnormality detecting unit and connected thereto via a network.

In the policy handling system of the present invention, a configuration may be employed wherein the policy retrieving section stores the retrieved policy and a retrieval time instant of thereof in the policy-operation-log storage section in association with each other.

In the policy handling system of the present invention, a configuration may be employed wherein the policy handling system further includes a plurality of the policy executing unit, which are connected to the abnormality detecting unit through a communication line. In this case, the abnormality detecting unit is notified of the policy that has triggered by the plurality of policy execution unit to detect the abnormality of the policy.

In the policy handling system of the present invention, a configuration may be employed wherein the policy-execution-pattern analyzing section stores a policy determined to be abnormal in a stopped-policy storage section storing a policy for which a trigger is to be stopped, and the policy retrieving section includes a policy-execution controlling section that refers to the stopped-policy storage section to determine whether or not triggering of the retrieved policy is to be stopped. In this case, the policy retrieving section stops triggering of the policy which is stored in the stopped-policy storage section, whereby execution of the abnormal policy can be prevented to suppress the adverse influence of the system by the execution of the abnormal policy.

In the policy handling system of the present invention, a configuration may be employed wherein the policy-execution-pattern analyzing section registers a policy determined to be abnormal in a policy-chain-information storage section in association with the triggered frequency and a latest execution time instant of the policy. In the policy handling system of the present invention, a configuration may be employed wherein the policy retrieving section includes a policy-execution-interval controlling section that calculates, if the retrieved policy has been registered in the policy-chain-information storage section, an estimated execution time instant of the policy based on the execution frequency and latest execution time of the policy stored in the policy-chain-information storage section, and causes the operation executing section to delay execution of the policy until the calculated estimated execution time. In this case, execution of the policy can be delayed until the estimated execution time instant, whereby a situation is prevented wherein a number of policies are executed in a short period.

In the policy handling system of the present invention, a configuration may be employed wherein the policy retrieving section registers the policy for which execution is stopped and estimated execution time instant of the policy in an operation standby table in association with each other, and causes the operation executing section to execute the policy of which the execution is stopped at the estimated execution time instant registered in the operation standby table. In this case, the policy retrieving section refers to the operation standby table to delay the execution of the policy until the estimated execution time instant.

In the policy handling system of the present invention, a configuration may be employed wherein the policy retrieving section includes a policy-approximation-degree evaluating section that determines the degree of approximation between policies based on at least one of the triggering condition and operation to be executed, and updates the execution frequency of the policy determined to be abnormal and execution frequency of a policy determined by the policy-approximation-degree evaluating section to be approximating the abnormal policy stored in the policy-chain-information storage section. In this cases a situation is suppressed wherein a large number of policies having a higher approximation degree therebetween are triggered in a short time period.

The present invention provides, in a second aspect thereof, a method for detecting an abnormity of a policy in a policy handling system for managing a management-targeted system based on policies in which a triggering condition for triggering the policy and operation to be executed are associated with each other, the method comprising the steps of: receiving a notification of a policy having a triggering condition which is satisfied, and referring to a policy-operation-log storage section storing the operation history of a policy to acquire an triggered frequency in a time period before the receiving the notification with regard to the policy having the triggering condition which is satisfied; and determining whether or not the policy is abnormal based on the acquired triggered frequency of the policy.

The present invention provides, in a third aspect thereof, a program for a computer that manages a management-targeted system based on a policy in which a triggering condition for triggering the policy and operation to be executed are associated with each other, the program allowing the computer to execute: processing of receiving a notification of a policy having a triggering condition which is satisfied, and referring to a policy-operation-log storage section storing the operation history of policies to acquire a triggered frequency in a time period before receiving the notification with regard to the policy having the triggering condition which is satisfied; and processing of determining whether or not the policy is abnormal based on the acquired triggered frequency of the policy.

In the abnormal policy detecting method and program of the present invention, the triggering frequency of a policy is detected with reference to the policy operation log, to detect an abnormality of the policy based on the triggered frequency thereof. By employing such a configuration, a situation wherein the policy is frequently triggered to cause an abnormal situation can be detected, whereby a situation wherein the system shifts to an abnormal and unstable state due to an inadequate policy can be avoided.

In the abnormal policy detecting method of the present invention, a configuration may be employed wherein the step of acquiring the triggered frequency acquires the number of triggering times of the policy during a history acquisition period before receiving the notification, and the step of determining whether or not the policy is abnormal determines that the policy is abnormal when the number of triggering times of the policy during the history acquisition period exceeds a predetermined threshold. In the program of the present invention, the processing of acquiring the triggered frequency acquires the number of triggering times of the policy during a history acquisition period before receiving the notification, and the processing of determining whether or not the policy is abnormal determines that the policy is abnormal when the number of triggering times of the policy during the history acquisition period exceeds a predetermined threshold. In this case, the abnormality of the policy can be detected based on the number of triggering times (situation of the triggering) during the history acquisition period.

In the method of the abnormal policy detecting method of the present invention, a configuration may be employed wherein the step of acquiring the triggered frequency refers to a history-acquisition-period storage section storing a policy and a history acquisition period in association with each other, to acquire the history acquisition period of the policy having the triggering condition which is satisfied. In the program of the present invention, a configuration may be employed wherein the processing of acquiring the triggered frequency refers to a history-acquisition-period storage section storing a policy and a history acquisition period in association with each other, to acquire the history acquisition period of the policy having the triggering condition which is satisfied. In this case, the history acquisition period can be determined for each policy, whereby the abnormality detection of the policy can be performed depending on the history acquisition period.

In the abnormal policy detecting method of the present invention, a configuration may be employed wherein the method further includes the step of calculating average and variance of at least one of past triggered frequency and triggering time interval, to calculate the history acquisition period based on the calculated average and variance, and storing the obtained history acquisition period in the history-acquisition-period storage section. In the program of the present invention, a configuration may be employed wherein the program further allows the computer to execute processing of calculating average and variance of at least one of past triggered frequency and triggering time interval to calculate the history acquisition period based on the calculated average and variance, and storing the obtained history acquisition period in the history-acquisition-period storage section.

In abnormal policy detecting method of the present invention, a configuration may be employed wherein the step of determining whether or not the policy is abnormal refers to a policy-triggering-count-threshold storage section storing a policy and a threshold in association with each other, to acquire the threshold. In the program of the present invention, a configuration may be employed wherein the processing of determining whether or not the policy is abnormal refers to a policy-triggering-count-threshold storage section storing a policy and a threshold in association with each other, to acquire the threshold.

In the abnormal detecting method of the present invention, a configuration may be employed wherein the method further includes the steps of: calculating average and variance of the number of triggering times of the policy during a specific period; and calculating the threshold based on the calculated average and variance and storing the threshold in the policy-triggering-count-threshold storage section. In the program of the present invention, a configuration may be employed wherein the program further allows the computer to execute processing of calculating average and variance of the number of triggering times of the policy during a specific period, and processing of calculating the threshold based on the calculated average and variance, and storing the threshold in the policy-triggering-count-threshold storage section. In this case, the threshold can be dynamically determined based on the situation of the triggering of policy.

In the abnormal detecting method of the present invention, a configuration may be employed wherein the method further includes the steps of determining a degree of approximation between policies based on at least one of the triggering condition and operation to be executed, wherein the step of determining the triggered frequency regards a policy determined to be approximating the policy having the triggering condition which is satisfied in the step of determining the degree of approximation as the same as the policy having the triggering condition which is satisfied and acquires, from the policy-operation-log storage section (107), the number of triggering times of the policy determined to be approximating the policy having the triggering condition which is satisfied. In the program of the present invention, a configuration may be employed wherein the program further allows the computer to execute processing of determining a degree of approximation between policies based on at least one of triggering condition and operation to be executed, wherein the processing of determining the triggered frequency regards a policy determined to be approximating the policy having the triggering condition which is satisfied as the same as the policy having the triggering condition which is satisfied and acquires, from the policy-operation-log storage section (107), the number of triggering times of the policy determined to be approximating the policy having the triggering condition which is satisfied. In this case, a policy having a higher approximation degree is regarded as the same policy, whereby a chain of triggering of the approximating policies can be detected.

In the abnormal policy detecting method of the present invention, a configuration may be employed wherein the method further includes, before the step of determining whether or not the policy is abnormal, the step of referring to a policy flag table (141) storing a policy and an influence-degree flag indicating whether or not policy-operation-abnormality determination processing needs to be performed for the policy to determine whether or not the policy having the triggering condition which is satisfied is abnormal. In the program of the present invention, a configuration may be employed wherein the program further allows the computer to execute, before the processing of determining whether the policy is abnormal or not, the processing of referring to a policy flag table storing a policy and an influence-degree flag indicating whether or not the policy-operation-abnormality determination processing needs to be performed for the policy to determine whether or not the policy having the triggering condition which is satisfied is abnormal. In this case, by setting the influence degree flag of a specific policy so that the specific policy does not need the policy-operation-abnormality determination processing, determination of whether or not the policy is abnormal can be omitted for the specific policy, such as log storage processing during the triggering, which does not cause an abnormality.

The policy handling system, method and program according to the present invention refers to an operation log of a policy to check the triggered frequency of the policy and detects an abnormality in the policy based on the triggered frequency. Thus, it is possible to detect a situation in which the same policy is frequently triggered to cause an abnormality and to detect a chain of errors which is not intended by a policy programmer to prevent the system from shifting to an abnormal and/or unstable state due to inadequate policy or policies.

BRIEF DESCRIPTION OF THE DRAWINGS

FIG. 2 is a flowchart showing an operation procedure of the policy handling system 100;

FIG. 3 is a view showing a concrete example of a policy stored in the policy database 104;

FIG. 4 is a view showing a concrete example of the operation history stored in the policy-operation-log storage section 107;

FIG. 7 is a flowchart showing an operation procedure of the policy handling system 100a;

FIG. 17 is a view showing a concrete example of a policy stored in the policy database 104;

FIG. 18 is a view showing a concrete example of an operation log of a policy stored in the policy-operation-log storage section 107;

FIG. 21 is a view showing a concrete example of a policy stored in the policy database 104f;

FIG. 24 is a view showing a concrete example of a policy stored in the policy database 104 of the policy retrieving unit 10 shown in FIG. 22;

FIG. 25 is a view showing a concrete example of a policy stored in the policy database 104 of a policy retrieving unit 11 shown in FIG. 22;

FIG. 26 is a view showing a concrete example of a policy stored in the policy database 104 of a policy retrieving unit 12 shown in FIG. 22;

FIG. 27 is a view showing a concrete example of a policy operation log stored in the policy-operation-log storage section 107;

FIG. 32 is a view showing a concrete example of a policy stored in the policy database 104;

FIG. 33 is a view showing information stored in the policy-chain-information storage section 126;

FIG. 34 is a view showing a concrete example of information stored in the operation standby table 127;

BEST MODE FOR CARRYING OUT THE INVENTION

Figure 1:
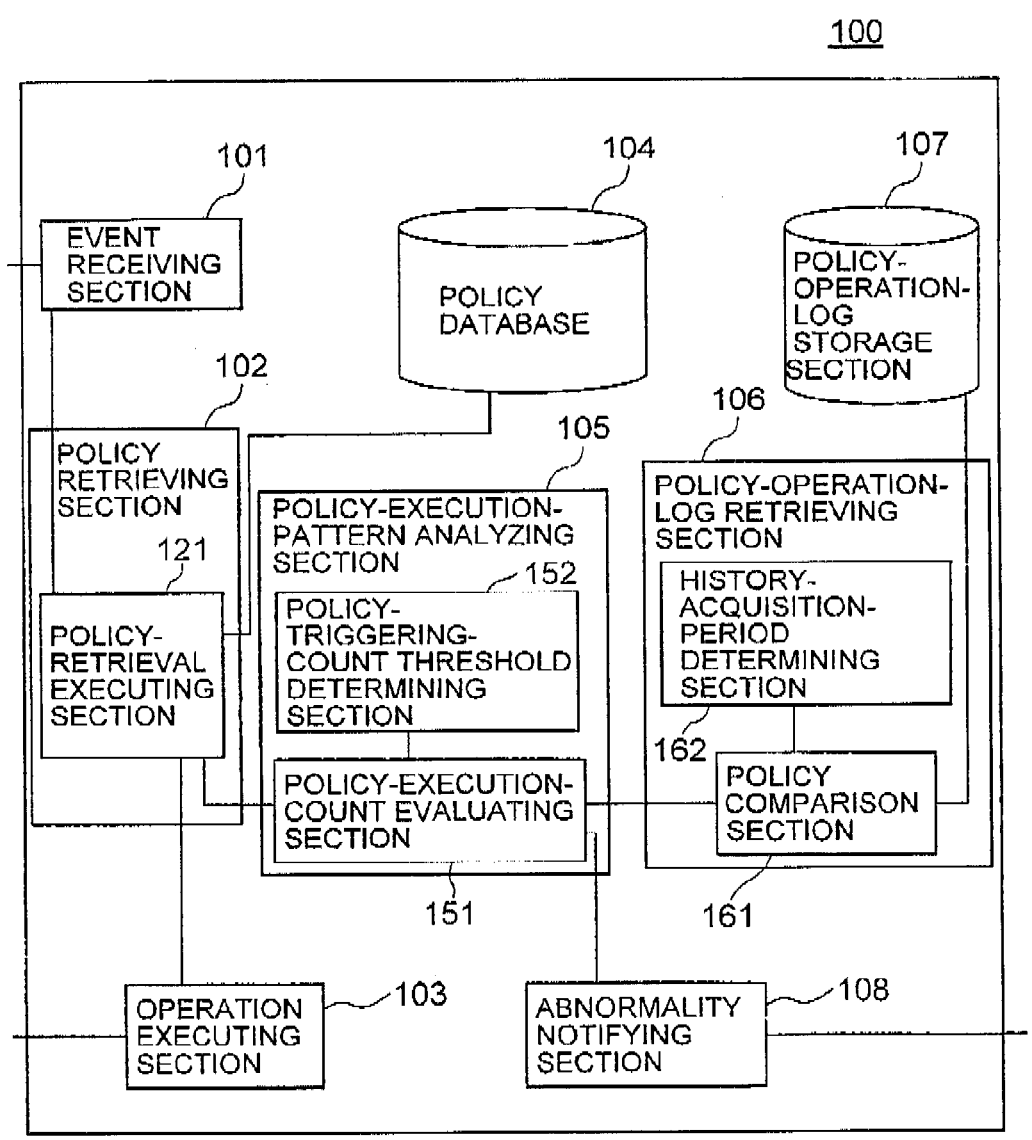
FIG. 1 is a block diagram showing the configuration of a policy handling system according to a first embodiment of the present invention.

Now, embodiments of the present invention will be described in greater detail with reference to the accompanying drawings. FIG. 1 shows the configuration of a policy handling system according to a first embodiment of the present invention. The policy handling system 100 includes an event receiving section 101, a policy retrieving section 102, an operation executing section 103, a policy database 104, a policy-execution-pattern analyzing section 105, a policy-operation-log retrieving section 106, a policy-operation-log storage section 107, and an abnormality notifying section 108. The policy handling system 100 receives notification of an event generated in a management target, triggers a policy according to the event, and executes the operation specified in the policy for the management target to thereby autonomously manage a device connected thereto through a network not shown. Further, the policy handling system 100 automatically assigns a resource depending on service load.

Typically, the policy handling system 100 is realized by a computer system having a CPU, a main storage unit, an auxiliary storage unit, an input unit, and an output unit reading a predetermined program and operating according to the program. The functions of the policy retrieving section 102, policy-execution-pattern analyzing section 105, policy-operation-log retrieving section 106, and abnormality notifying section 108 are each achieved by operation of program or programs. The policy database 104 and policy-operation-log storage section 107 are each configured by a storage unit such as a hard disk drive for storing predetermined data. The event receiving section 101 and operation executing section 103 are each configured by an interface to a network.

The event receiving section 101 is configured by an interface for receiving an event occurrence notification from an external device. The policy database 104 stores therein policies. The policy database 104 stores, as information of each policy, a triggering condition indicating an event satisfying the triggering condition of the policy, operation executed when the policy is triggered, and a triggered operation including an operation target. The triggering condition of a policy specifies the type of an event and range of a parameter of the policy, and examples thereof include, "when present time reaches 8:00 PM", "when request for service A is made by an authenticated user", and the like.

The policy retrieving section 102 includes a policy-retrieval executing section 121 and searches the policy database 104. The policy-retrieval executing section 121 refers to the policy database 104 to retrieve a policy having a triggering condition which matches an event that has been received by the event receiving section 101. The operation executing section 103 executes operation of a policy retrieved by the policy retrieving section 102.

The policy-operation-log storage section 107 stores the history of policies that have been retrieved by the policy retrieving section 102. The history information stored in the policy-operation-log storage section 107 includes the type of the policies that have been retrieved by the policy retrieving section 102 and the time instant at which the policies were retrieved. The policy-operation-log retrieving section 106 has a policy comparison section 161 and a history-acquisition-period determining section 162. The policy-operation-log retrieving section 106 refers to the policy-operation-log storage section 107 to retrieve the triggering history of a policy. The history-acquisition-period determining section 162 presents, e.g., a previously set specified period to the policy comparison section 161. The policy comparison section 161 retrieves the same policy as that has been retrieved by the policy retrieving section 102 from a history corresponding to the period offered by the history-acquisition-period determining section 162 and passes the retrieved policy to the policy-execution-pattern analyzing section 105. Further, the policy comparison section 161 registers the history information of the policy retrieved by the policy retrieving section 102 in the policy-operation-log storage section 107.

The policy-execution-pattern analyzing section 105 has a policy-execution-count evaluating section 151 and a policy-triggering-count-threshold determining section 152. The policy-execution-pattern analyzing section 105 analyzes the history of the policy retrieved by the policy retrieving section 102 and detects an abnormality in the policy operation according to a predetermined condition. The policy-triggering-count-threshold determining section 152 presents a predetermined value as a threshold to the policy-execution-count evaluating section 151. The policy-execution-count evaluating section 151 receives the operation history of the policy retrieved by the policy retrieving section 102 from the policy-operation-log retrieving section 106 and compares the number of operations of the policy and threshold presented by the policy-triggering-count-threshold determining section 152. When the number of operations is greater than the threshold, the policy-execution-pattern analyzing section 105 detects that an abnormality occurs. When an abnormality in the policy operation has been detected by the policy-execution-pattern analyzing section 105, the abnormality notifying section 108 notifies an administrator or the like of the corresponding information. The notification to the administrator can be made through, e.g., E-mail.

FIG. 2 shows an operation procedure of the policy handling system 100. The event receiving section 101 receives a generated event (step S201) and passes the received event to the policy retrieving section 102. The policy retrieving section 102 refers to the policy database 104 to retrieve a policy having a triggering condition that matches the received event information (step S202). The policy retrieving section 102 then determines whether or not a policy matching the event information has been retrieved (step S203). When determining that a policy matching the event information exists in the policy database 104, the policy retrieving section 102 notifies the policy-operation-log retrieving section 106 of the policy matching the event information. On the other hand, when determining that a policy matching the event information does not exist in the policy database 104, this flow is ended, and the policy handling system 100 prepares for the next occurrence of an event.

When the policy comparison section 161 of the policy-operation-log retrieving section 106 receives the policy retrieved in step S202 from the policy retrieving section 102, the history-acquisition-period determining section 162 acquires the period during which the operation history of the policy is referred to and presents the acquired period to the policy comparison section 161 (step S204). The policy comparison section 161 acquires a recent operation history corresponding to the period acquired in step S204 with regard to the policy retrieved in step S202, checks the number of times the policy was retrieved during the period (step S205), and notifies the policy-execution-pattern analyzing section 105 of the number of retrievals, i.e., the number of executions of the policy. Thereafter, the policy comparison section 161 registers the policy retrieved by the policy retrieving section 102 and the time instant at which the policy was retrieved in the policy-operation-log storage section 107.

Upon acquiring the number of retrievals of the policy during a specific period from the policy-operation-log retrieving section 106, the policy-execution-count evaluating section 151 of the policy-execution-pattern analyzing section 105 acquires a threshold from the policy-triggering-count-threshold determining section 152 (step S206) and compares the threshold with the number of operations of the policy notified from the policy comparison section 161 (step S207). When determining that the number of operations of the policy exceeds the threshold, the policy-execution-count evaluating section 151 causes the abnormality notifying section 108 to notify an administrator or the like of information indicating that an abnormality occurs in the policy operation (step S208). Thereafter, the policy-execution-count evaluating section 151 causes the operation executing section 103 to execute the policy retrieved in step S202 (step S209). On the other hand, when determining that the number of operations of the policy is not more than the threshold, the policy-execution-count evaluating section 151 advances directly to step S209 and causes the operation executing section 103 to execute the policy retrieved in step S202.

The operation of the policy handling system 100 will be described in more detail using a concrete example. FIG. 3 shows a concrete example of the policy stored in the policy database 104. The policy includes a policy ID, a triggering condition, and a triggered operation. The policy ID is an identifier for uniquely identifying the policy. Examples of the policy ID include "PolicyA", 4"ResetAt22", and the like. The triggering condition is one that specifies the event within a specific range. Examples of the triggering condition include "time=22:00 meaning "when present time reaches 10:00 pm, [server="serverB", cpuload>0.9] meaning "when load on server B is 0.9 or more", and [authorized=true, request="serviceA"] meaning "when request to use service A is made from authenticated user".

The operation of the policy specifies the operation that the operation executing section 103 executes when the policy is triggered upon the occurrence of an event matching the triggering condition of the policy. More specifically, the operation of the policy specifies the type of a message to be sent and destination address to which the message is to be sent. Examples of the operation include "to stop application provided by service A", "to perform mirroring of service of server B on server D", "to create mirror server of service B", and the like.

FIG. 4 shows a concrete example of the operation history stored in the policy-operation-log storage section 107. The policy-operation-log storage section 107 stores, in the chronological order of triggering, the policy ID of the triggered (retrieved) policy and triggering time. For example, if "PolicyA" is triggered at 22:01:22 on March 21, the policy-operation-log storage section 107 stores [PolicyA; 03:21:22:01:22] representing the above ID and triggering time.

It is assumed that the event receiving section 101 has received an event [server="serverB", cpuload=0.95] representing that the load on the server B is 0.95, at 22:02:24 on March 21. In this case, the policy retrieving section 102 searches for a policy having a triggering condition [server=""serverB, cpuload=0.95] in step S202. With reference to FIG. 3, a policy matching the triggering condition is "PolicyA". Thus, the policy retrieving section 102 notifies the policy-execution-pattern analyzing section 105 of the policy ID "PolicyA" and time instant (3/21 22:02:24) at which the "PolicyA" was retrieved.

The policy-execution-pattern analyzing section 105 inquires the policy-operation-log retrieving section 106 as to the number of triggering times of the policy having the notified policy ID "PolicyA". The policy-operation-log retrieving section 106 first determines the history acquisition period in the history-acquisition-period determining section 162 in step S204 and then acquires the number of triggering times of the policy during the determined history acquisition period in the policy comparison section 161 in step S205. In the determination of the history acquisition period in step S204, the history-acquisition-period determining section 162 refers to a setting file for defining the period during which the history is acquired, to thereby determine, e.g., "30 seconds" as the history acquisition period.

In the acquisition of the number of triggering times of the policy in step S203, the policy comparison section 161 first refers to the policy-operation-log storage section 107 to acquire a list of policies triggered during the time interval between the triggering time of the policy "3/21 22:02:24" and time instant "3/21 22:01:54" which is obtained by subtracting 30 seconds, which is history acquisition period, from the triggering time. Subsequently, the policy comparison section 161 counts the number of policies having the policy ID "PolicyA" included in the list and passes the number of triggering times of the "PolicyA" to the policy-execution-pattern analyzing section 105. In the example of FIG. 4, the number of triggering times of the "PolicyA" counted by the policy comparison section 161 is "3".

The policy-execution-pattern analyzing section 105 determines the threshold in the policy-triggering-count-threshold determining section 152 in step S207 and then compares the threshold and the number of triggering times of the policy received from the policy comparison section 161 in the policy-execution-count evaluating section 151 in step S207. In the determination of the threshold in step S206, the policy-triggering-count-threshold determining section 152 refers to a setting file defining the threshold to determine, e.g., "5" as the threshold. Since the number of triggering times of the "PolicyA" is "3", it is determined in step S207 that the number of triggering times of the policy is smaller than the threshold. Accordingly, the process advances to step S209 where the operation executing section 103 executes the operation of the "policyA", i.e., "to perform mirroring of service of server B on server D".

Assume that the event receiving section 101 has received an event [server="serverC", cpuload=0.95] representing that the load on the server C is 0.95 at 22:02:26 on March 21. In this case, the policy retrieving section 102 searches for a policy having a triggering condition [server="serverB", cpuload=0.95] in step S202. Referring to FIG. 3, a policy matching the triggering condition is "PolicyC". Thus, the policy retrieving section 102 notifies the policy-execution-pattern analyzing section 105 of the policy ID "PolicyC" and time (3/21 22:02:26) at which the "PolicyC" was retrieved.

The policy-execution-pattern analyzing section 105 inquires the policy-operation-log retrieving section 106 about the number of triggering times of the policy having the notified policy ID "PolicyC". The policy-operation-log retrieving section 106 first determines the history acquisition period in the history-acquisition-period determining section 162 in step S204 and then acquires the number of triggering times of the policy during the determined history acquisition period in the policy comparison section 161 in step S205. In the example of FIG. 4, the number of triggering times of the "PolicyC" between "3/21 22:01:56" and "3/21 22:02:26" which is acquired in step S205 is "6".

The policy-execution-pattern analyzing section 105 determines the threshold in the policy-triggering-count-threshold determining section 152 in step S206 and then compares the threshold and the number of triggering times of the policy received from the policy comparison section 161 in the policy-execution-count evaluating section 151 in step S207. Since the number of triggering times of the "PolicyC" is "6", the policy-execution-count evaluating section 151 determines in step S207 that the number of triggering times of the policy exceeds the threshold "5" and passes the policy ID "PolicyC" of the policy causing an abnormality to the abnormality notifying section 108. Thereafter, in step S208, the abnormality notifying section 108 notifies the administrator of information indicating that "Policy C causes an abnormality" through E-mail or the like.

In the present embodiment, the number of times a policy was triggered during the specified period is checked upon triggering of the policy. Thus, if the number of triggering times of the policy exceeds the predetermined threshold, that is, in the case where the policy was triggered at a frequency more than the specified value, this check result is determined as an indication of occurrence of an abnormality, in which the policy is executed in a chain reaction to cause the system unstable, and notifies the abnormality to the administrator. With the above configuration, it is possible to detect a negative spiral in which the operation according to the policies worsens the system state and repeatedly triggers the same policy, thereby preventing the failure caused by the triggering of the policy from spreading.

Figures 5, 6:
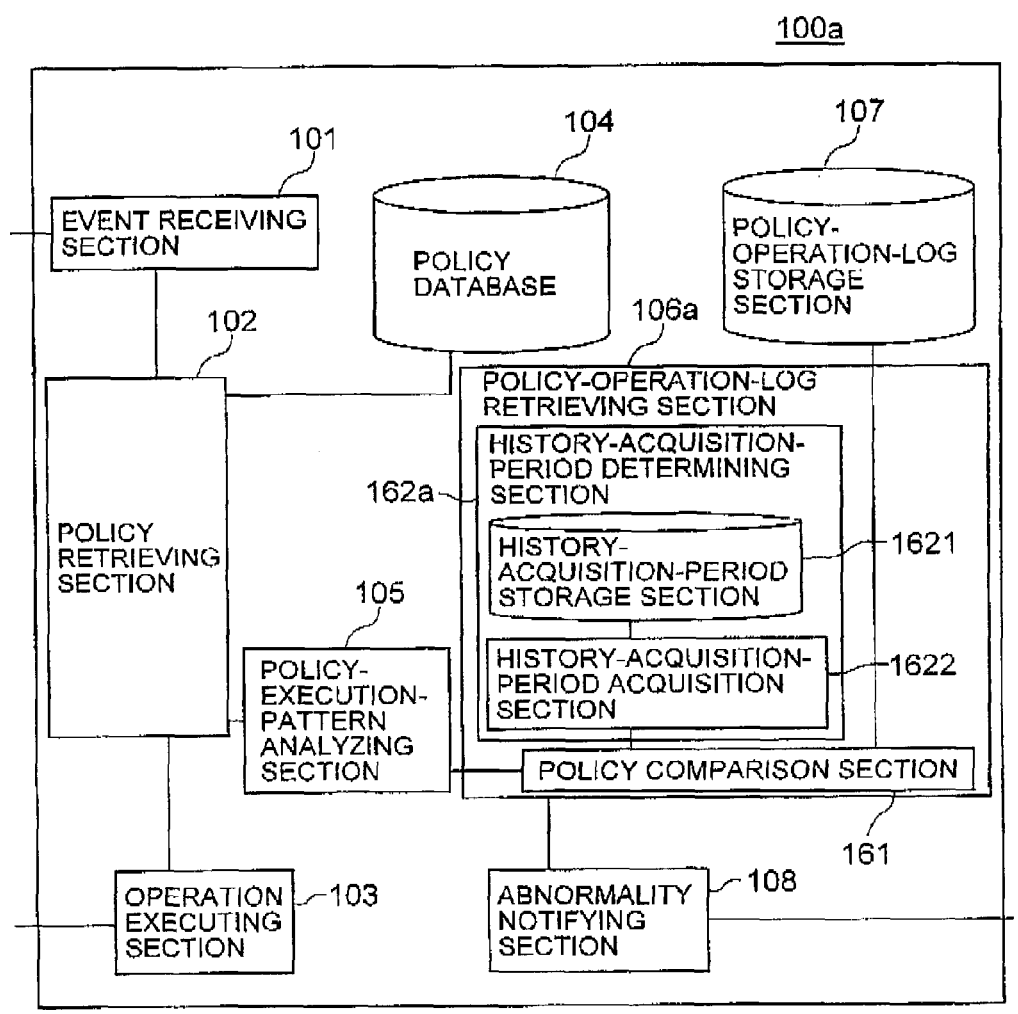
FIG. 5 is a block diagram showing the configuration of a policy handling system according to a second embodiment of the present invention.
FIG. 6 is a view showing a concrete example of the history acquisition period stored in the history-acquisition-period storage section 1621.

FIG. 5 shows the configuration of a policy handling system according to a second embodiment of the present invention. The policy handling system 100a of the present embodiment differs from the policy handling system 100 of the first embodiment shown in FIG. 1 in that the history-acquisition-period determining section 162a includes a history-acquisition-period storage section 1621 and a history-acquisition-period acquisition section 1622. FIG. 6 shows a concrete example of a history acquisition period stored in the history-acquisition-period storage section 1621. The history-acquisition-period storage section 1621 stores therein a policy ID and a history acquisition period in association with each other. The history-acquisition-period acquisition section 1622 acquires a history acquisition period corresponding to the policy retrieved by the policy retrieving section 102 from the history-acquisition-period storage section 1621, and presents the acquired history acquisition period to the policy comparison section 161.

Figure 7:
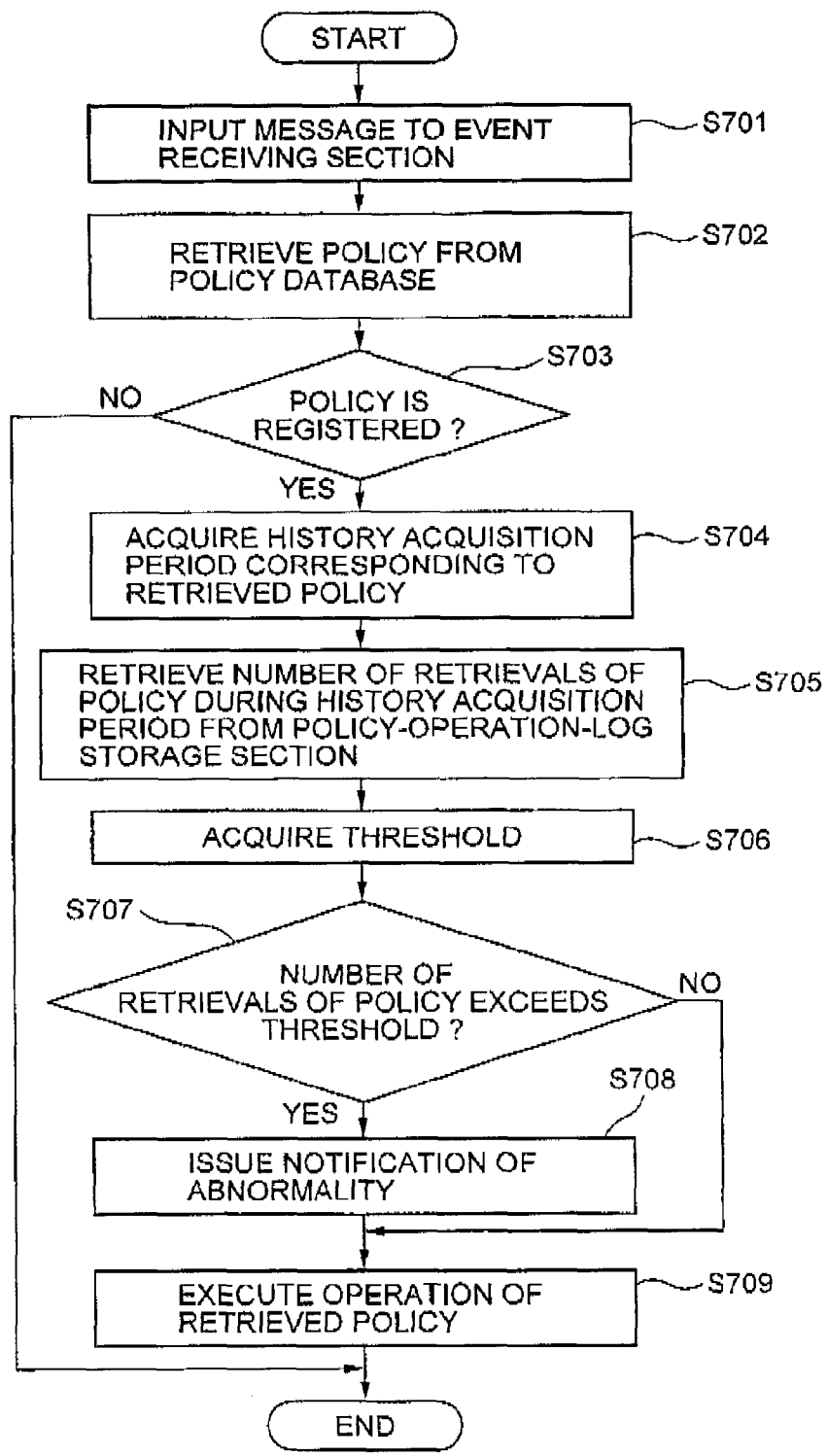

FIG. 7 shows an operation procedure of the policy handling system 100a. The policy handling system 100a performs operation similar to the operation of steps S201 to S203 of FIG. 2 to retrieve a policy to be triggered in association with the received event (steps S701 to 703). Upon retrieval of the policy, the history-acquisition-period acquisition section 1622 uses the policy ID of the policy retrieved in step S702 as a key to search the history-acquisition-period storage section 1621 to acquire a history acquisition period corresponding to the policy, and presents the acquired history acquisition period to the policy comparison section 161 (step S704). The policy comparison section 161 acquires, from the policy-operation-log storage section 107, a recent operation history corresponding to the history acquisition period presented in step S704 with regard to the policy retrieved by the policy retrieving section 102, and checks the number of times the policy was retrieved during the period (step S705), and notifies the policy-execution-pattern analyzing section 105 of the number of executions of the policy.

Assuming that, for example, the policy ID of the policy retrieved in step S702 is "PolicyA" (FIG. 3), the history-acquisition-period acquisition section 1622 acquires, as the history acquisition period corresponding to the "PolicyA", "40 seconds" from the list, shown in FIG. 6, which stores the policy ID and history acquisition period in association with each other, in step S704, and presents the acquired result to the policy comparison section 161. Assuming that the "PolicyA" is triggered at "3/21 22:02:24", the policy comparison section 161 refers to the policy-operation-log storage section 107 (FIG. 4) in step S705 to acquire "4" as the number of triggering times of the "PolicyA" during the period from "3/21 22:01:44" which is obtained by subtracting the history acquisition period, "40 seconds", from the triggering time to "3/21 22:02:24", and notifies the policy-execution-pattern analyzing section 105 of the acquired result.

Assuming that, for example, the policy ID of the policy retrieved in step S702 is "PolicyC", the history-acquisition-period acquisition section 1622 presents, as the history acquisition period corresponding to the "PolicyC", "20 seconds" (FIG. 6) to the policy comparison section 161 in step S704. Assuming that the "PolicyC" is triggered at "3/21 22:02:26", the policy comparison section 161 refers to the policy-operation-log storage section 107 (FIG. 4) in step S705 to acquire "4" as the number of triggering times of the "PolicyC" during a period from "3/21 22:02:06" to "3/21 22:02:26" and notifies the policy-execution-pattern analyzing section 105 of the acquired result.

Upon acquiring the number of triggering times of the policy, the policy-execution-pattern analyzing section 105 performs operation similar to the operation of step S206, to acquire the threshold for determining an abnormality of the number of triggering times of the policy (step S706). Then, the policy-execution-count evaluating section 151 compares the number of operations of the policy during the specified period, which is acquired in step S705, against the threshold (step S707). When determining that the number of operations of the policy exceeds the threshold, the policy-execution-count evaluating section 151 causes the abnormality notifying section 108 to notify the administrator or the like of information indicating that an abnormality occurs in the policy operation (step S708). Thereafter, the policy-execution-count evaluating section 151 causes the operation executing section 103 to execute the policy retrieved in step S702 (step S709). On the other hand, when determining that the number of operations of the policy is not more than the threshold, the policy-execution-count evaluating section 151 advances directly from step S707 to step S709 and causes the operation executing section 103 to execute the policy.

In the present embodiment, the period during which the history of the number of triggering times of a policy is acquired can be made different for each policy. Thus, in addition to the advantage obtained in the first embodiment, the following advantage is obtained. That is, the period during which the history of the number of triggering times of a policy is retrieved can appropriately be set individually for each policy depending on the execution frequency of the policy at a normal stage, importance of a policy, level of influence of a policy on the entire system, and the like, thereby preventing false detection of an abnormality due to influence of fluctuation in the arrival time of an event which is caused by setting of an excessively short history acquisition period. This results in an increase in the accuracy of the abnormality detection.

Figure 8:
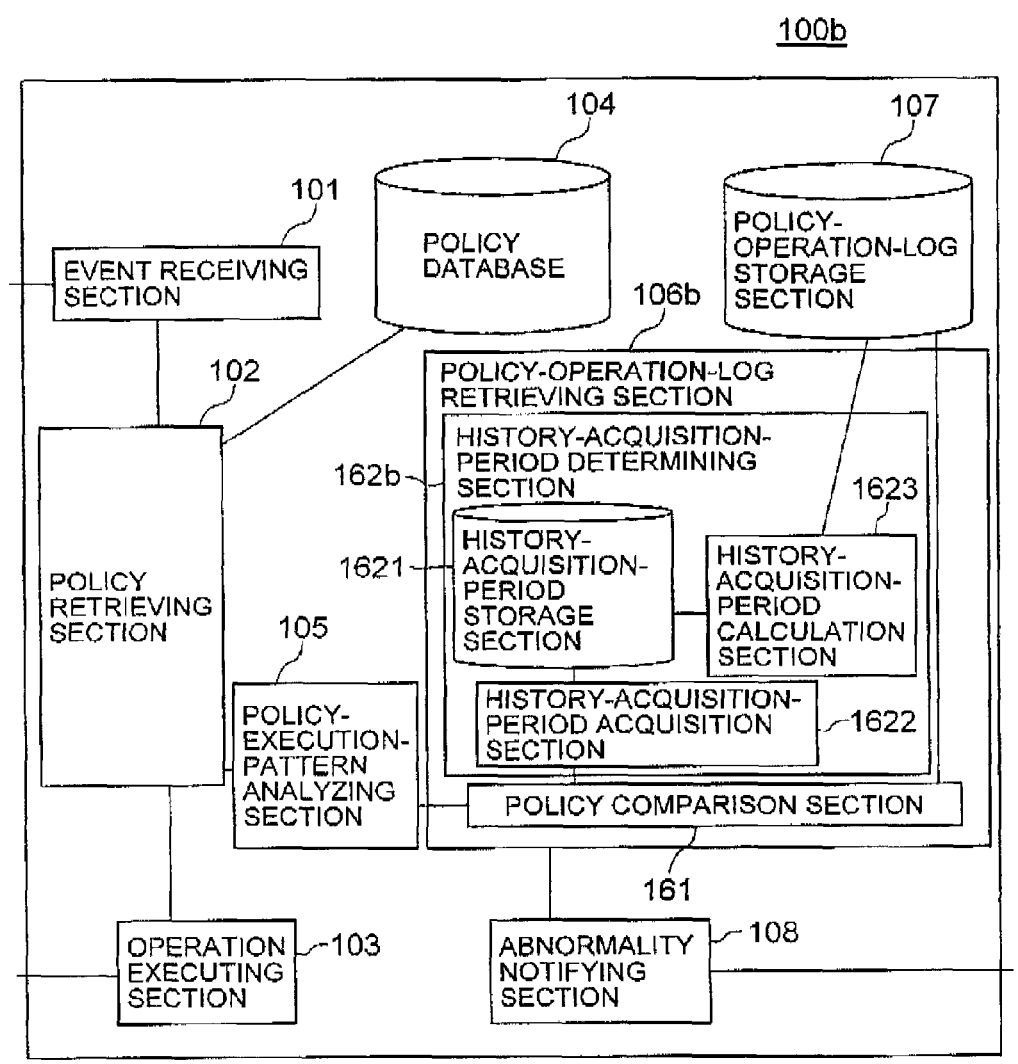
FIG. 8 is a block diagram showing the configuration of a policy handling system according to a third embodiment of the present invention.

FIG. 8 shows the configuration of a policy handling system according to a third embodiment of the present invention. The policy handling system 100b of the present embodiment differs from the policy handling system 100a of the second embodiment shown in FIG. 5 in that the history-acquisition-period determining section 162a further includes a history-acquisition-period calculation section 1623. The history-acquisition-period calculation section 1623 stores therein information indicating the frequency at which each policy was triggered, and determines the period during which the history of each policy is to be retrieved, by using the average and variance of the frequency.

Figure 9:
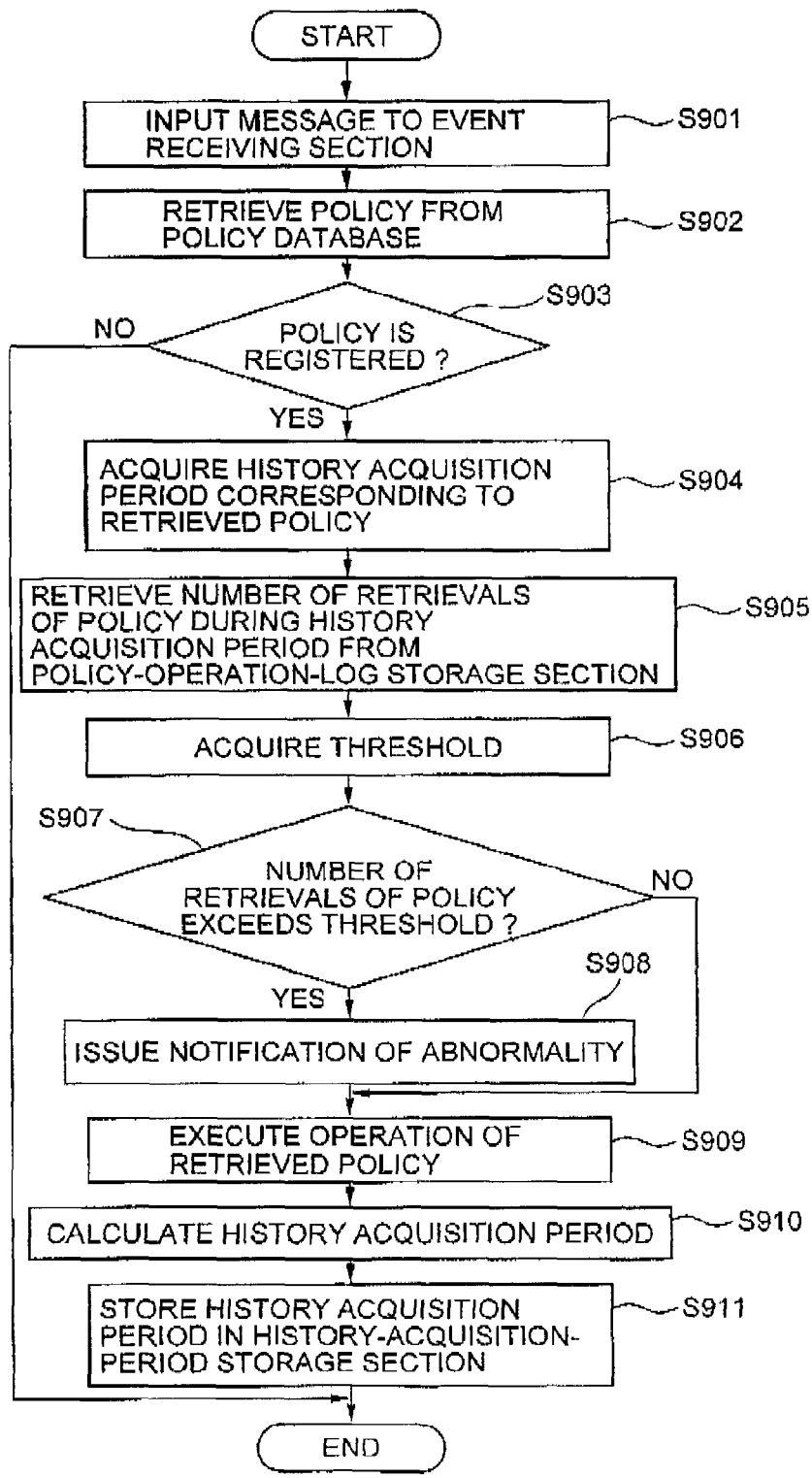
FIG. 9 is a flowchart showing an operation procedure of a policy handling system 100b.

FIG. 9 shows an operation procedure of the policy handling system 100b. The policy handling system 100b performs operation similar to the operation of steps S701 to S709 of FIG. 7, to thereby retrieve a policy to be triggered in association with the received event, acquire the number of triggering times of the policy during the history acquisition period corresponding to the policy, check whether or not the number of triggering times of the policy exceeds the threshold and, if the number of triggering times of the policy exceeds the threshold, notify the administrator or the like of information indicating that an abnormality occurs in the policy operation (steps S901 to S909).

The history-acquisition-period calculation section 1623 refers to the history of the retrieved policy to calculate the average and variance of the arrival frequency of the policy, calculates the history acquisition period based on these values (step S910), and stores the calculated value in the history-acquisition-period storage section 1621 as the history acquisition period of the policy (step S911). For example, in the calculation of the history acquisition period, the history-acquisition-period calculation section 1623 refers to the policy-operation-log storage section 107, checks the time interval of the policy triggering during a specific period, such as one day or one month, and calculates the inverse number of the time interval so as to calculate the average and variance values. Subsequently, the history-acquisition-period calculation section 1623 compares the average and variance obtained at the time at which the policy was last retrieved and those obtained at this time. If an increase in the variance is larger than a predetermined value, the history-acquisition-period calculation section 1623 increases the history acquisition time interval from the current value.

In the present embodiment, the history-acquisition-period calculation section 1623 determines the period during which the history of the retrieved policy is acquired based on the actual triggering state. With this configuration, it is possible to acquire the history of a policy from the appropriate history acquisition period corresponding to the actual triggering state of the policy even in the case where the optimal history acquisition period cannot previously be estimated.

Figures 10, 11:
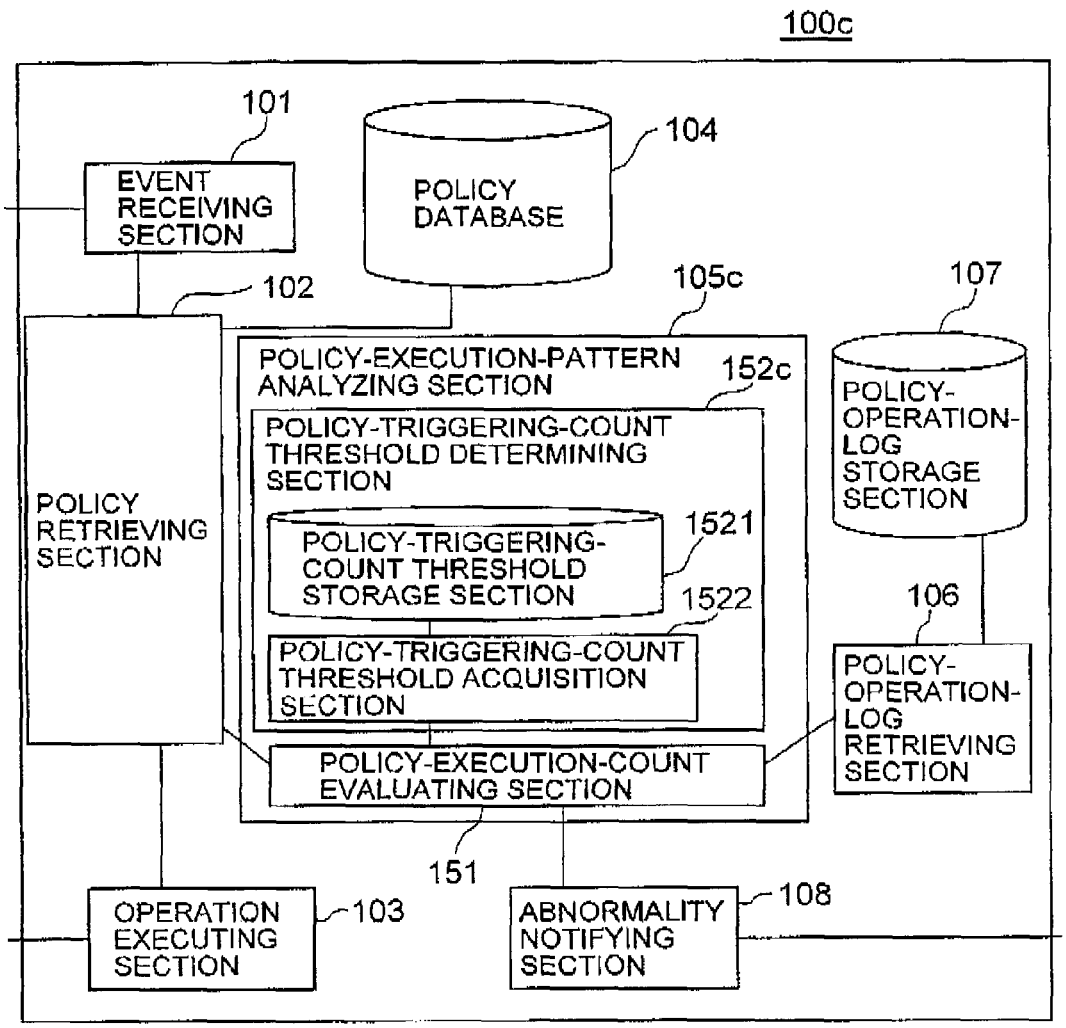
FIG. 10 is a block diagram showing the configuration of a policy handling system according to a fourth embodiment of the present invention.
FIG. 11 is a view showing a concrete example of the policy-triggering-count-threshold stored in a policy-triggering-count-threshold storage section 1521.

FIG. 10 shows the configuration of a policy handling system according to a fourth embodiment of the present invention. The policy handling system 100c of the present embodiment differs from the policy handling system 100 of the first embodiment shown in FIG. 1 in that the policy-triggering-count-threshold determining section 152c includes a policy-triggering-count-threshold storage section 1521 and a policy-triggering-count-threshold acquisition section 1522. FIG. 11 shows an example of the policy-triggering-count threshold stored in the policy-triggering-count-threshold storage section 1521. The policy-triggering-count-threshold storage section 1521 stores a policy ID and the threshold used for detecting an abnormality in the policy operation. The policy-triggering-count-threshold acquisition section 1522 refers to the policy-triggering-count-threshold storage section 1521 to acquire a threshold corresponding to the policy retrieved by the policy retrieving section 102, and presents the threshold to the policy-execution-count evaluating section 151.

Figure 12:
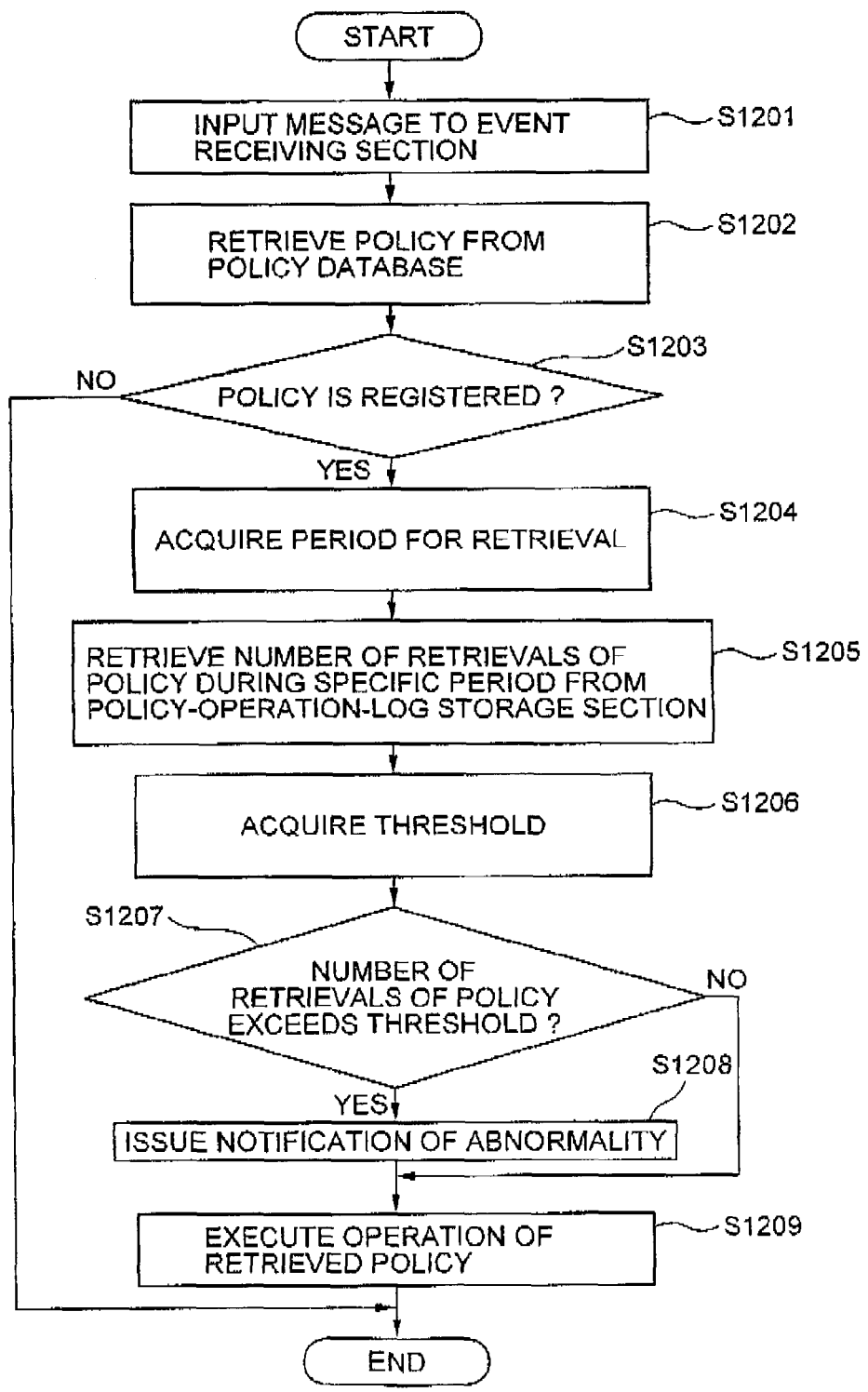
FIG. 12 is a flowchart showing an operation procedure of the policy handling system 100c.

FIG. 12 shows an operation procedure of the policy handling system 100c. The policy handling system 100c performs operation similar to the operation of steps S201 to S205 of FIG. 2, to thereby retrieve the policy to be triggered in association with the received event, and acquires the operation history (number of operations) of the policy during the specified period (step S1201 to S1205). The policy-triggering-count-threshold acquisition section 1522 uses the policy ID of the policy retrieved in step S1202 as a key to search the policy-triggering-count-threshold storage section 1521 to acquire a threshold corresponding to the policy and presents the acquired threshold to the policy-execution-count evaluating section 151 (step S1206).

The policy-execution-count evaluating section 151 compares the number of operations of the policy during a specific period which is acquired in step S1205 with the threshold presented in step S1206 (step S1207). When determining that the number of operations of the policy exceeds the threshold, the policy-execution-count evaluating section 151 causes the abnormality notifying section 108 to notify the administrator or the like of information indicating that an abnormality occurs in the policy operation (step S1208). Thereafter, the policy-execution-count evaluating section 151 causes the operation executing section 103 to execute the policy retrieved in step S1202 (step S1209). On the other hand, when determining that the number of operations of the policy is not more than the threshold, the policy-execution-count evaluating section 151 advances directly from step S1207 to step S1209 and causes the operation executing section 103 to execute the policy.

Assuming that, for example, the policy ID of the policy retrieved in step S1202 is "PolicyA" (FIG. 3), the policy-triggering-count-threshold acquisition section 1522 acquires, as a threshold corresponding to the "PolicyA", "2" from the list (FIG. 11) storing the policy ID and policy-triggering-count-threshold in association with each other, and presents the acquired result to the policy-execution-count evaluating section 151. Assuming that the "PolicyA" is triggered at "3/21 22:02:24", the policy comparison section 161 refers to the policy-operation-log storage section 107 (FIG. 4), to acquire "3" as the number of triggering times of the "PolicyA" during the period from "3/21 22:01:54" which is obtained by subtracting the history acquisition period, "30 seconds", represented by the history-acquisition-period determining section 162 (FIG. 1) from the triggering time to "3/21 22:02:24" and notifies the policy-execution-pattern analyzing section 105 of the acquired result. In this example, the number "3" of triggering times of the "PolicyA" exceeds the threshold "2". Accordingly, information indicating that an abnormality occurs in the policy operation is notified to the administrator or the like in step 1208.

Assuming that, for example, the policy ID of the policy retrieved in step S1202 is "PolicyC", the policy-triggering-count-threshold acquisition section 1522 acquires, as a threshold corresponding to the "PolicyC", "6" from the list (FIG. 11) storing the policy ID and policy-triggering-count-threshold in association with each other, and presents the acquired result to the policy-execution-count evaluating section 151. Assuming that the "PolicyC" is triggered at "3/21 22:02:26", the policy comparison section 161 refers to the policy-operation-log storage section 107 (FIG. 4) to acquire "6" as the number of triggering times of the "PolicyC" during the period from "3/21 22:01:56" which is obtained by subtracting the history acquisition period, "30 seconds", from the triggering time to "3/21 22:02:26", and notifies the policy-execution-pattern analyzing section 105 of the acquired result. In this example, the number "6" of triggering times of the "PolicyC" does not exceed the threshold "6", whereby information indicating that an abnormality occurs in the policy operation is not notified, and the policy operation is directly executed.

In the present embodiment, the policy-triggering-count-threshold determining section 152c presents a threshold corresponding to the retrieved policy to the policy-execution-count evaluating section 151. With this configuration, it is possible to set an appropriate threshold of the number of triggering times depending on the execution frequency of a policy at a normal stage, importance of the policy, level of influence of the policy on the entire system, and the like. Thus, both a false detection of an abnormality due to influence of an excessively small threshold, and a failure in detection of an abnormality due to an excessively high threshold can be suppressed, resulting in an increase in the accuracy of the abnormality detection.

Figure 13:
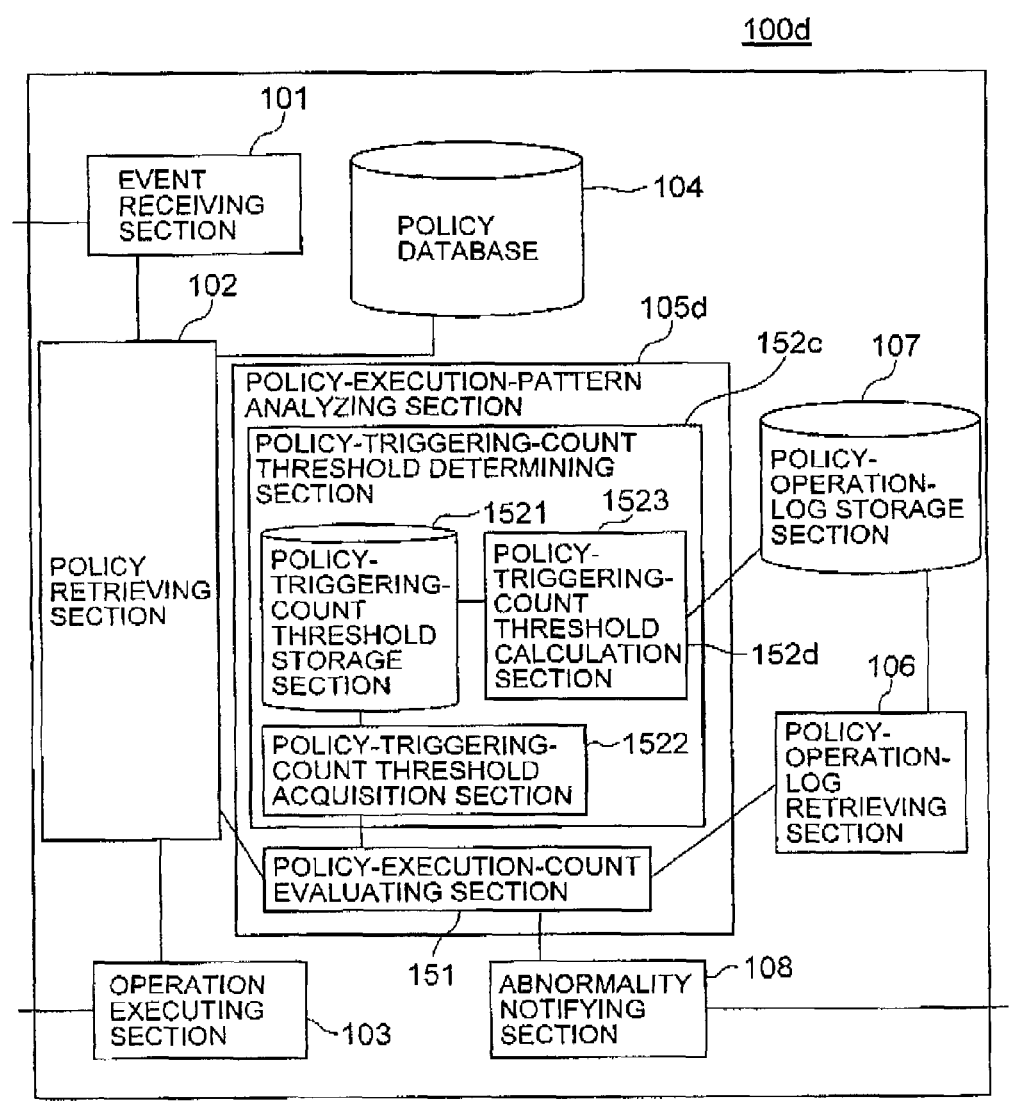
FIG. 13 is a block diagram showing the configuration of a policy handling system according to a fifth embodiment of the present invention.

FIG. 13 shows the configuration of a policy handling system according to a fifth embodiment of the present invention. The policy handling system 100d of the present embodiment differs from the policy handling system 100c of the fourth embodiment in that the policy-triggering-count-threshold determining section 152d further includes a policy-trigger-ing-count-threshold calculation section 1523. The policy-triggering-count-threshold calculation section 1523 refers to the policy-operation-log storage section 107 to calculate the frequency at which each policy was triggered and, based on the average and variance of the frequency, calculates a threshold for determining an abnormality in each policy.

Figure 14:
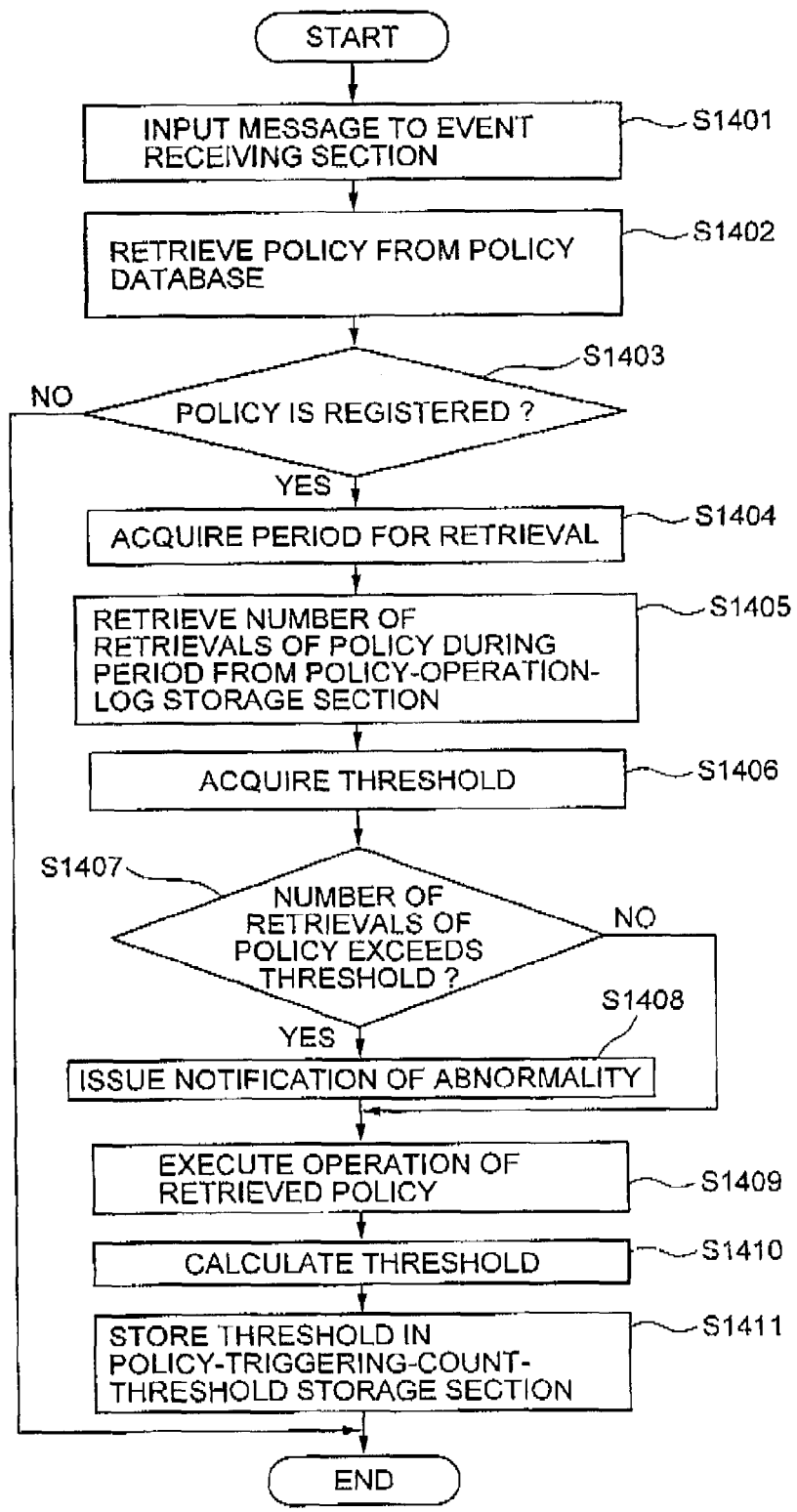
FIG. 14 is a flowchart showing an operation procedure of the policy handling system 100d.

FIG. 14 shows an operation procedure of the policy handling system 100d. The policy handling system 100d performs operation similar to the operation of steps S1201 to S1209 of FIG. 12, to retrieve a policy to be triggered in association with the received event, acquire the number of triggering times of the policy, and check whether or not the number of triggering times of the policy exceeds a threshold corresponding to the policy and, if the number of triggering times of the policy exceeds the threshold, notifies the administrator or the like of information indicating that an abnormality occurs in the policy operation (step S1401 to S1409).

The policy-triggering-count-threshold calculation section 1523 refers to the history of the retrieved policy, to calculate the average and variance of the arrival frequency of the policy, calculate a threshold for determining an abnormality based on the average and variance values (step S1410), and store the calculated value in the policy-triggering-count-threshold storage section 1521 as a threshold corresponding to the retrieved policy (step S1411). For example, in the calculation of the threshold, the policy-triggering-count-threshold calculation section 1523 refers to the policy-operation-log storage section 107, checks the number of triggering times of the policy during each history acquisition period, such as one day or one month specified, and calculates the average and variance thereof. Subsequently, the policy-triggering-count-threshold calculation section 1523 compares the average and variance obtained at the time at which the policy was last retrieved and those obtained at this time. If an increase in the variance is larger than a predetermined value, the policy-triggering-count-threshold calculation section 1523 increases the threshold larger from the current value.

In the present embodiment, the policy-triggering-count-threshold calculation section 1523 determines a threshold for determining whether an abnormality occurs in the retrieved policy based on the actual triggering state. With this configuration, it is possible to set an appropriate threshold depending on the actual triggering state of the policy even if an operator or the like registering policies cannot preciously estimate an optimal threshold.

Figure 15:
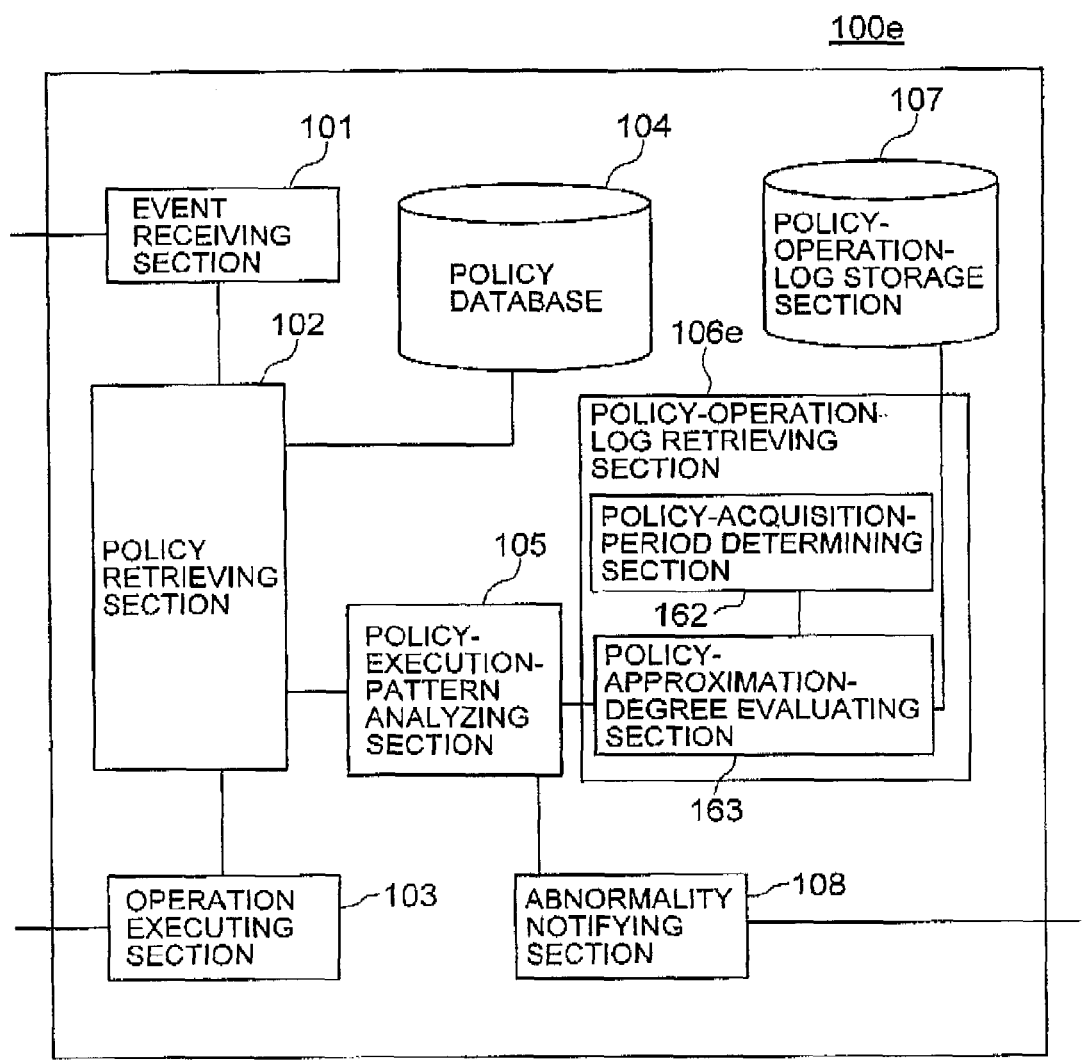
FIG. 15 is a block diagram showing the configuration of a policy handling system according to a sixth embodiment of the present invention.

FIG. 15 shows the configuration of a policy handling system according to a sixth embodiment of the present invention. The policy handling system 10e of the present embodiment differs from the policy handling system 100 of the first embodiment shown in FIG. 1 in that the policy-operation-log retrieving section 106 includes a policy-approximation-degree evaluating section 163 in place of the policy comparison section 161. The policy-approximation-degree evaluating section 163 calculates the degree of approximation between policies based on the triggering condition of the policy, operation target of the policy and type thereof, and a method invoked by the policy, and refers to the policy-operation-log storage section 107 to count the number of triggering times of the policy approximate to the retrieved policy.

Figure 16:
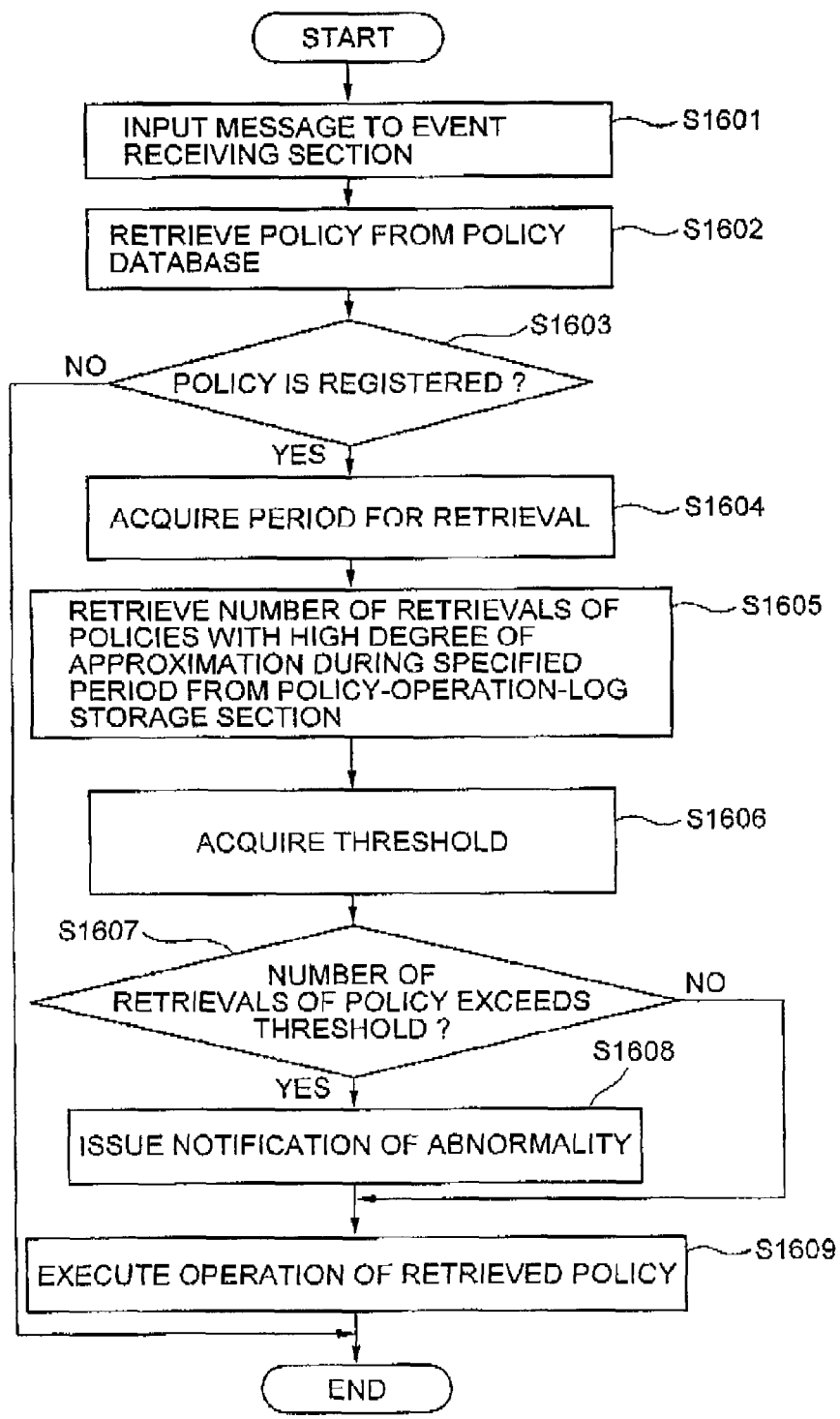
FIG. 16 is a flowchart showing an operation procedure of the policy handling system 100e.

FIG. 16 shows an operation procedure of the policy handling system 100e. The policy handling system 100e performs operation similar to the operation of steps S201 to S204 of FIG. 2 to retrieve a policy to be triggered in association with the received event and determine the history acquisition period (steps S1601 to S1604). The policy-approximation-degree evaluating section 163 refers to the operation history corresponding to the history acquisition period presented in step S1604 with regards to the retrieved policy, counts the number of policies having a high degree of approximation, i.e., the number of policies similar to the policy retrieved in step S1602, and notifies the policy-execution-pattern analyzing section 105 of the count result (step S1605).

Upon receiving a notification of the number of triggering times of policies approximating the retrieved policy, the policy-execution-pattern analyzing section 105 performs operation similar to the operation of step S206 to acquire a threshold for determining an abnormality of the number of operations of the policy (step S1606). The policy-execution-count evaluating section 151 compares the number of operations of the policy acquired in step S1605 against the threshold presented in step S1606 (step S1607). When determining that the numbers of operations of the policy exceeds the threshold, the policy-execution-count evaluating section 151 causes the abnormality notifying section 108 to notify the administrator or the like of information indicating that an abnormality occurs in the policy operation (step S1608). Thereafter, the policy-execution-count evaluating section 151 causes the operation executing section 103 to execute the policy retrieved in step S1602 (step S1609). On the other hand, when determining that the number of operations of the policy is not more than the threshold, the policy-execution-count evaluating section 151 advances directly from step S1607 to step S1609 and causes the operation executing section 103 to execute the policy.

Hereinafter, a description will be given in more detail using a concrete example. FIG. 17 shows a concrete example of the policies stored in the policy database 104. The triggering condition of "PolicyE" is [server=*, bandwidth>80] and operation thereof is "to create mirror server of device indicated by value of "server" in event". The method of the "PolicyE" is "to create mirror server" and operation target thereof changes depending on the parameter value of the event serving as a trigger to trigger the policy.

The triggering condition of "PolicyF" is [server="serverF", diskspace<10], i.e., "when the remaining disk capacity of serverF becomes 10% or less" and operation thereof is "to backup serverF". The triggering condition of "PolicyG" is [server="serverF", diskwritesmn>500], i.e., "when the total amount of data written on a disk of the serverF becomes 500 Mbyte or more" and operation thereof is "to backup serverF".

FIG. 18 shows a concrete example of the operation log of policies stored in the policy-operation-log storage section 107. The policy-operation-log storage section 107 stores ID of the policies triggered, triggering time of the policies, and parameters at the triggering of thereof. In this example, the policy-operation-log storage section 107 stores therein information indicating that "PolicyE" was triggered for "serverA" with an event of "server"=serverA generated at 3/21 22:01:50 acting as a trigger. Further, the policy-operation-log storage section 107 stores therein information indicating that "PolicyE" was triggered for "serverB" at 3/21 22:01:55.

It is assumed that an event [server="serverA", bandwidth=90] is received by the event receiving section 101 at 3/21 22:02:24 in step S1601. In this case, "300CPolicyE" is retrieved in step S1602. In step S1605, the policy-approximation-degree evaluating section 163 acquires the operation log corresponding to the history acquisition period, e.g., 40 seconds, determined in step S1604 from the policy-operation-log storage section 107. Subsequently, the policy-approximation-degree evaluating section 163 calculates the degree of approximation based on the operation target and method of the policy retrieved in step S1602 and operation targets and methods of the policies included in the operation log acquired from the policy-operation-log storage section 107 and, based on the calculated approximation degree, counts the number of triggering times of a policy approximating the retrieved "PolicyE".

For example, in the above calculation, the approximation degree is set to "1" when the operation targets of a pair of policies coincide with each other or when the methods thereof coincide with each other. When both the operation targets and methods of the policy pair coincide with each other, the approximation degree is set to "2". For examples when the operation target of the "PolicyE" corresponding to an event input in step S1601 is "serverA", the approximation degree of a policy having an operation target which is "serverA" is set to "1" and, if the policy having an operation target which is "serverA" has a method "to create mirror server", "1" is further added to the approximation degree thereof.

The policy-approximation-degree evaluating section 163 determines that a policy having an approximation degree of "2" or more is a policy approximating the retrieved policy and refers to the operation history of the policy acquired from the policy-operation-log storage section 107 to count the number of policies with an approximation degree of "2" or more. Even though the triggered policy is the same policy (i.e., "PolicyE") that has been retrieved, if the operation target of the triggered policy is not "serverA", the policy-approximation-degree evaluating section 163 does not regard this policy as a policy approximating the retrieved policy and, accordingly, does not count the number of triggering times thereof.

In the example of FIG. 18, the "policyE" was triggered six times. Among them, the policy-approximation-degree evaluating section 163 counts the number "3" of triggering times of the "PolicyE" having a parameter "serverA" as the number of triggering times of the policy approximating the policy retrieved in step S1602. For example, when the threshold determined in step S1606 is "5", it is determined that the number of triggering times does not exceed the threshold. Accordingly, a notification indicating that an abnormality occurs is not issued, and the operation of the policy is executed in step S1609.

It is assumed that an event [server="serverF", diskspace=8] is substrates received by the event receiving section 101 at 3/21 22:02:25 in step S1601. In this case, "PolicyF" is retrieved in step S1602. The operation target of the retrieved "PolicyF" is "serverF". That is, "PolicyF" and "PolicyG" match this. Further, the method of the "PolicyF" is "to backup". That is, "PolicyF" and "PolicyG" match this. As a result, the "policyF" and "policyG" are extracted as a policy with an approximation degree of "2" or more from the operation log (FIG. 18) acquired from the policy-operation-log storage section 107.

In step S1605, the policy-approximation-degree evaluating section 163 refers to the policies included in the operation log acquired from the policy-operation-log storage section 107, to count the number of policies having an approximation degree of "2" or more, i.e., "6" which is obtained by adding the number of "policyF"s and that of "PolicyG"s as the number of triggering times of the policy approximating the policy retrieved in step S1602. For example, when the threshold determined in step S1606 is "5", it is determined that the number of triggering times exceeds the threshold. Accordingly, a notification indicating that an abnormality occurs is issued to the administrator or the like.

In the present embodiment, a concept of approximation is introduced to allow the policy-approximation-degree evaluating section 163 to count the number of triggering times of a policy approximating a retrieved policy, and it is determined whether or not the number of triggering times exceeds the threshold. Thus, by regarding a policy having an operation target or operation content i.e., having an intention or effect which is similar to those of the retrieved policy as the same one as the retrieved policy, even if not exactly the same, it is possible to increase the accuracy of the abnormality detection.

Figure 19:
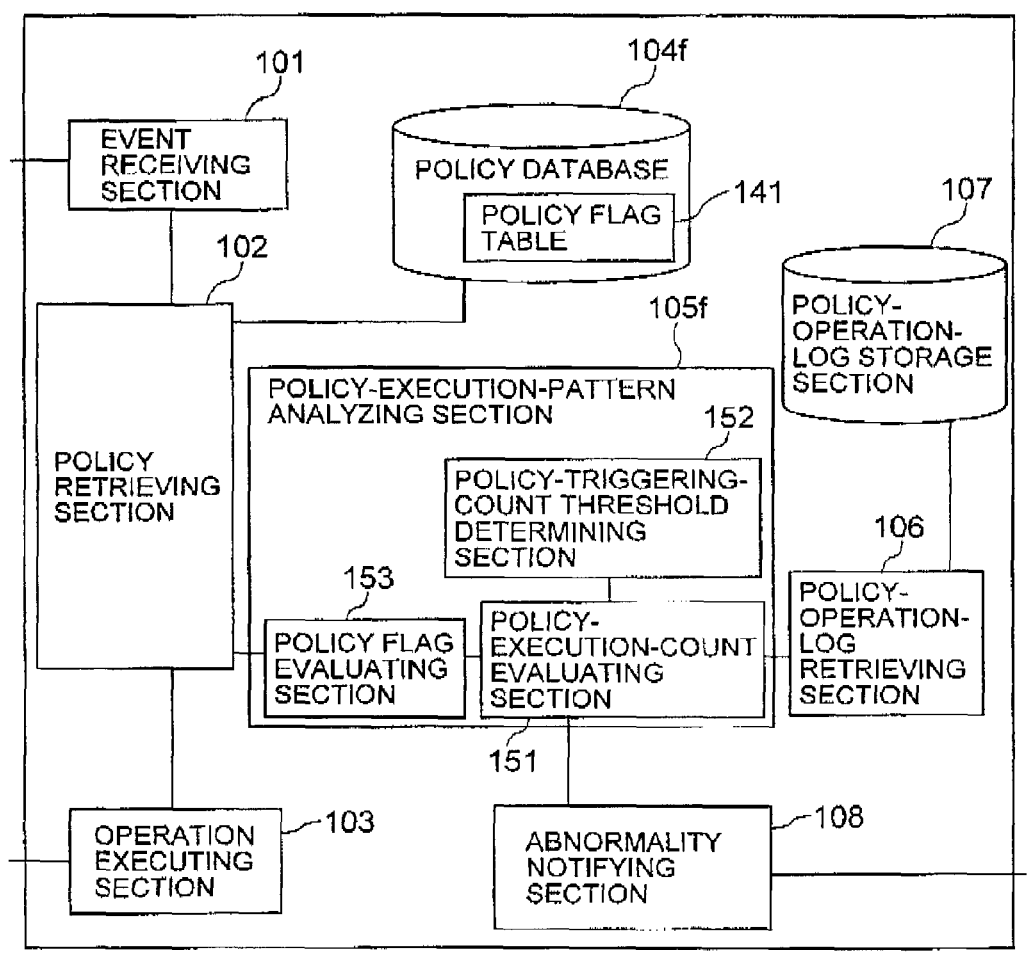
FIG. 19 is a block diagram showing the configuration of a policy handling system according to a seventh embodiment of the present invention.

FIG. 19 shows the configuration of a policy handling system according to a seventh embodiment of the present invention. The policy handling system 100f of the present embodiment differs from the policy handling system 100 of the first embodiment shown in FIG. 1 in that the policy-execution-pattern analyzing section 105f further includes a policy-flag evaluating section 153. The policy database 104f stores therein a policy flag table 141 showing an influence-degree flag indicating, for each policy, whether or not an abnormality detection processing is performed. The policy-flag evaluating section 153 refers to the policy flag table 141 to determine whether or not to pass the policy ID and the like to the policy-execution-count evaluating section 151 so as to cause the policy-execution-count evaluating section 151 to execute processing for detecting an abnormality in the policy operation.

Figure 20:
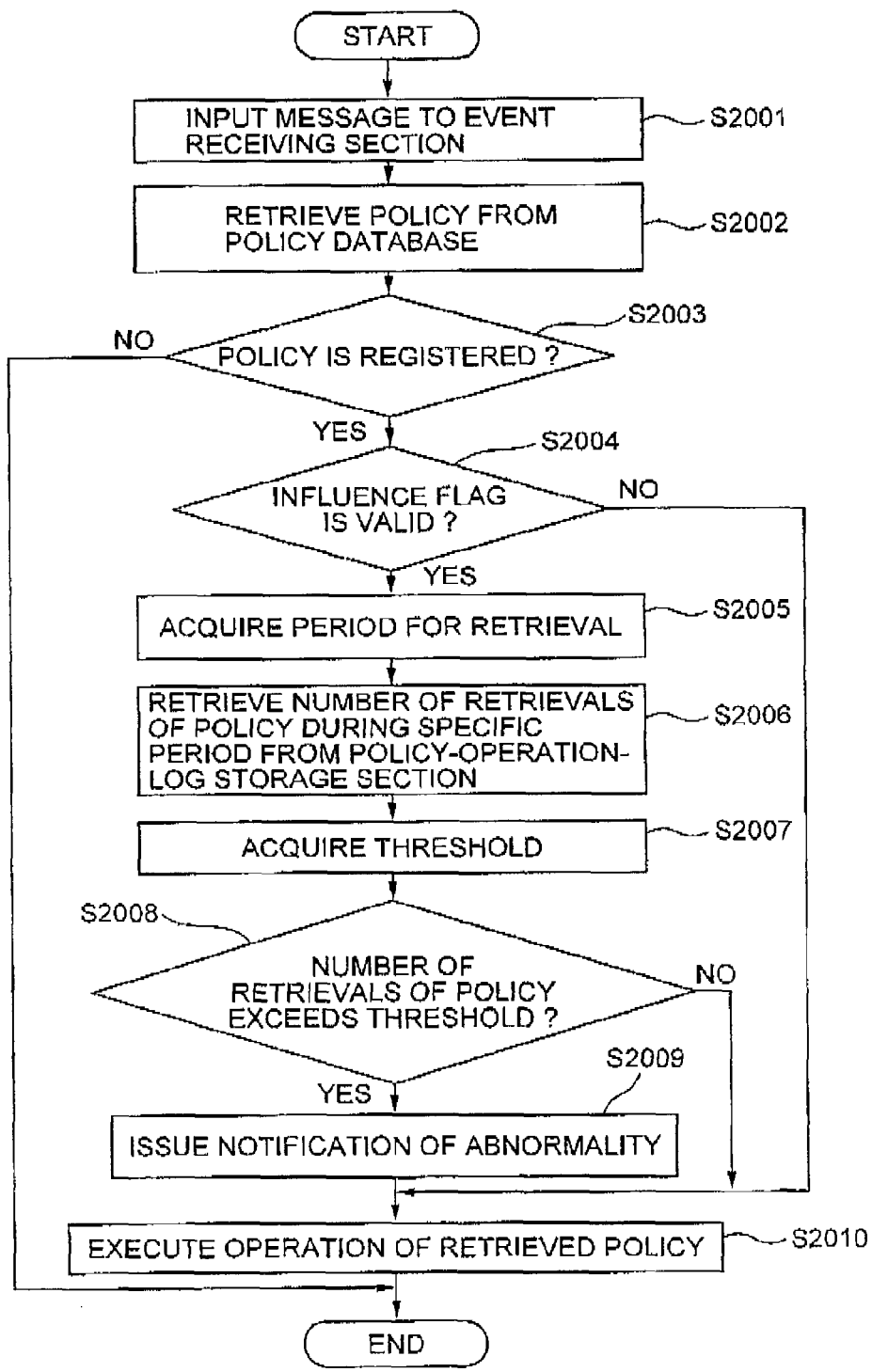
FIG. 20 is a flowchart showing an operation procedure of the policy handling system 100f.

FIG. 20 shows an operation procedure of the policy handling system 100f. The policy handling system 100f performs operation similar to the operation of steps S201 to S203 of FIG. 2 to retrieve a policy to be triggered in association with the received event (steps S2001 to S2003). The policy-flag evaluating section 153 refers to the policy flag table 141 of the policy database 104f to check whether or not the influence-degree flag of the policy retrieved in step S2002 is valid (step S2004). When the influence-degree flag is valid, the policy handling system 100f performs operation similar to the operation of steps S204 to S209 to check whether the number of triggering times of the retrieved policy exceeds a threshold number and, when the number of triggering times of the retrieved policy exceeds the threshold, issues a notification indicating occurrence of an abnormality (step S2005 to S2010). When the influence-degree flag is not valid, the process advances directly to step S2010, where the operation of the retrieved policy is executed.

The policy database 104f stores therein, as shown in FIG. 21, policy ID, triggering condition, triggered operation, and influence-degree flag in association with one another. For example, an event [server="serverA", programstart="service1", user="user1"] is received by the event receiving section 101 in step S2001, "policyH" is retrieved in step S2002. Then, in step S2004, the policy-flag evaluating section 153 checks whether the influence-degree flag of the retrieved "PolicyH" is valid (○) or invalid (X). In FIG. 21, the influence degree of the "PolicyH" is "X". Accordingly, check processing for determining whether or not the policy operation is abnormal is not performed, and the process directly advances to step S2010 where the operation of the "PolicyH", i.e., "to store user in operation log at triggering time" is executed.

In the present embodiment, an influence-degree flag indicating, for each policy, whether or not an abnormality detection processing is performed is prepared, and a check processing for determining whether or not the policy operation is abnormal is performed for a policy having a flag which is valid. Thus, for example, by setting "invalid" as the influence-degree flag of a policy for information acquisition, it is possible to prevent such a policy from being erroneously detected as an abnormal policy, thereby increasing the accuracy of the abnormality detection.

Figure 22:
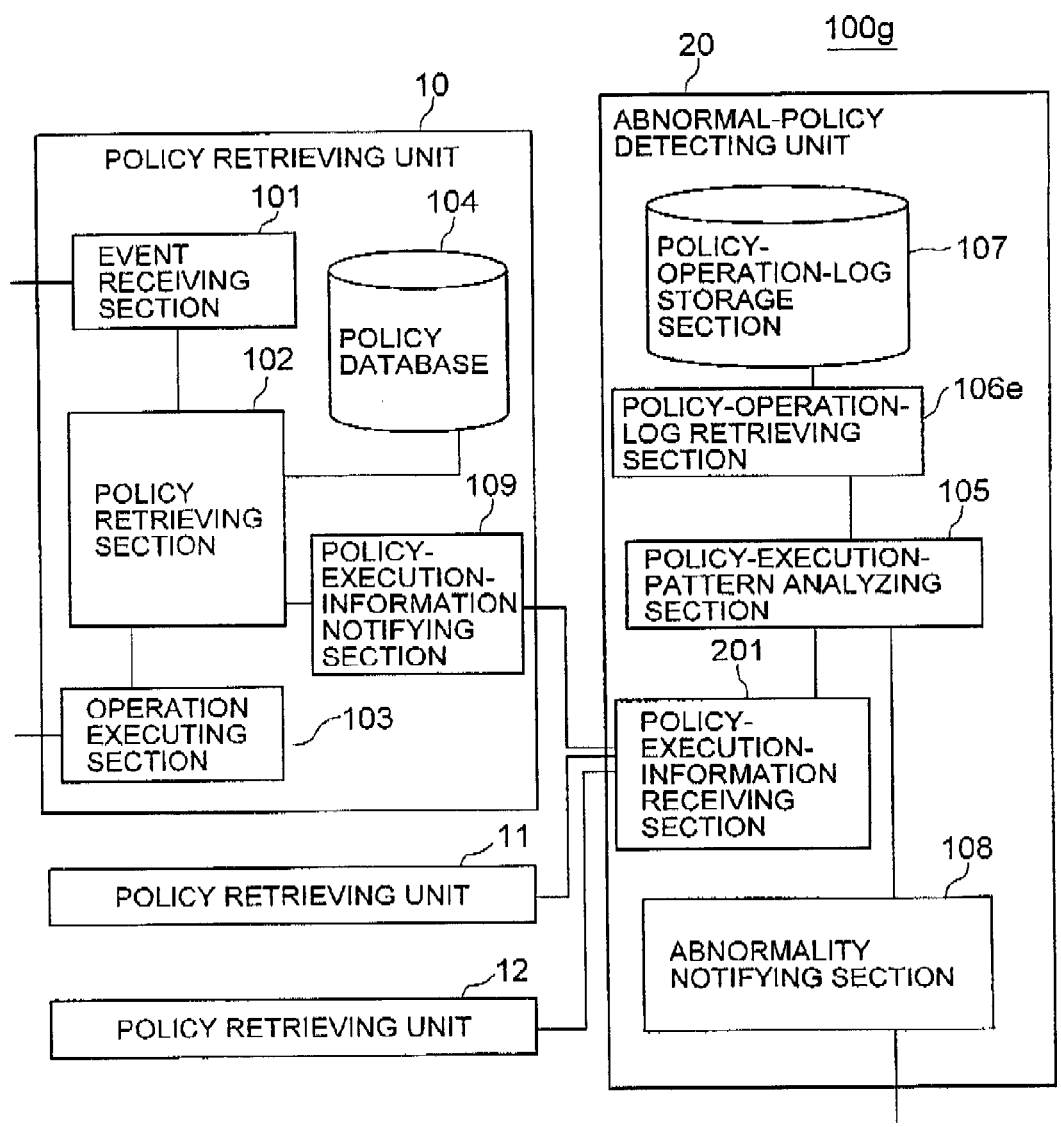
FIG. 22 is a block diagram showing the configuration of a policy handling system according to an eighth embodiment of the present invention.

FIG. 22 is a block diagram showing the configuration of a policy handling system according to an eight embodiment of the present invention. In the present embodiment, the policy handling system (system) 100g is divided into the following units: policy retrieving units 10, 11, 12 each for triggering and executing a policy corresponding to a received event, and an abnormal-policy detecting unit 20 for detecting an abnormality in the policy operation. Each of the policy retrieving units 10, 11, 12 includes a policy-execution-information notifying section 109, in addition to the event receiving section 101, policy retrieving section 102, operation executing section 103, and policy database which have a configuration similar to that of the corresponding sections in the policy handling system 100 of the first embodiment shown in FIG. 1. The abnormal-policy detecting unit 20 includes a policy-execution-information receiving section 201, in addition to the policy-execution-pattern analyzing section 105, policy-operation-log storage section 107, policy-operation-log retrieving section 106e, and abnormal notifying section 108 which have a configuration similar to that of corresponding sections in the policy handling system 100e of the sixth embodiment shown in FIG. 15.

The policy retrieving units 10, 11, 12 and abnormal-policy detecting unit 20 are each configured by a computer system such as a workstation. Each of the policy retrieving units 10, 11, 12 is connected to the abnormal-policy detecting unit 20 through a network. The policy retrieving units 10, 11, 12 manage different management-targeted devices, and execute the operation of a policy to the respective management-targeted devices according to an event generated in the respective devices. In each of the policy retrieving units 10, 11, 12, when a policy to be triggered is retrieved by the policy retrieving section 102 according to an event received by the event receiving section 101, the policy-execution-information notifying section 109 transmits the ID of the retrieved policy and the triggering time instant thereof to the policy-execution-information receiving section 201 of the abnormal-policy detecting unit 20.

The policy-execution-information receiving section 201 receives information of the policy triggered in any of the policy retrieving units 10, 11, and 12 and notifies the policy-execution-pattern analyzing section 105 of the received information. The policy-execution-pattern analyzing section 105 acquires, from the policy-operation-log retrieving section 106e, the number of triggering times of a policy approximating the policy retrieved in the policy retrieving units 10, 11, and 12. The policy-execution-pattern analyzing section 105 compares the acquired number of triggering times of the policy approximating the retrieved policy against the threshold, so as to detect an abnormality in the policy operation.

Figure 23:
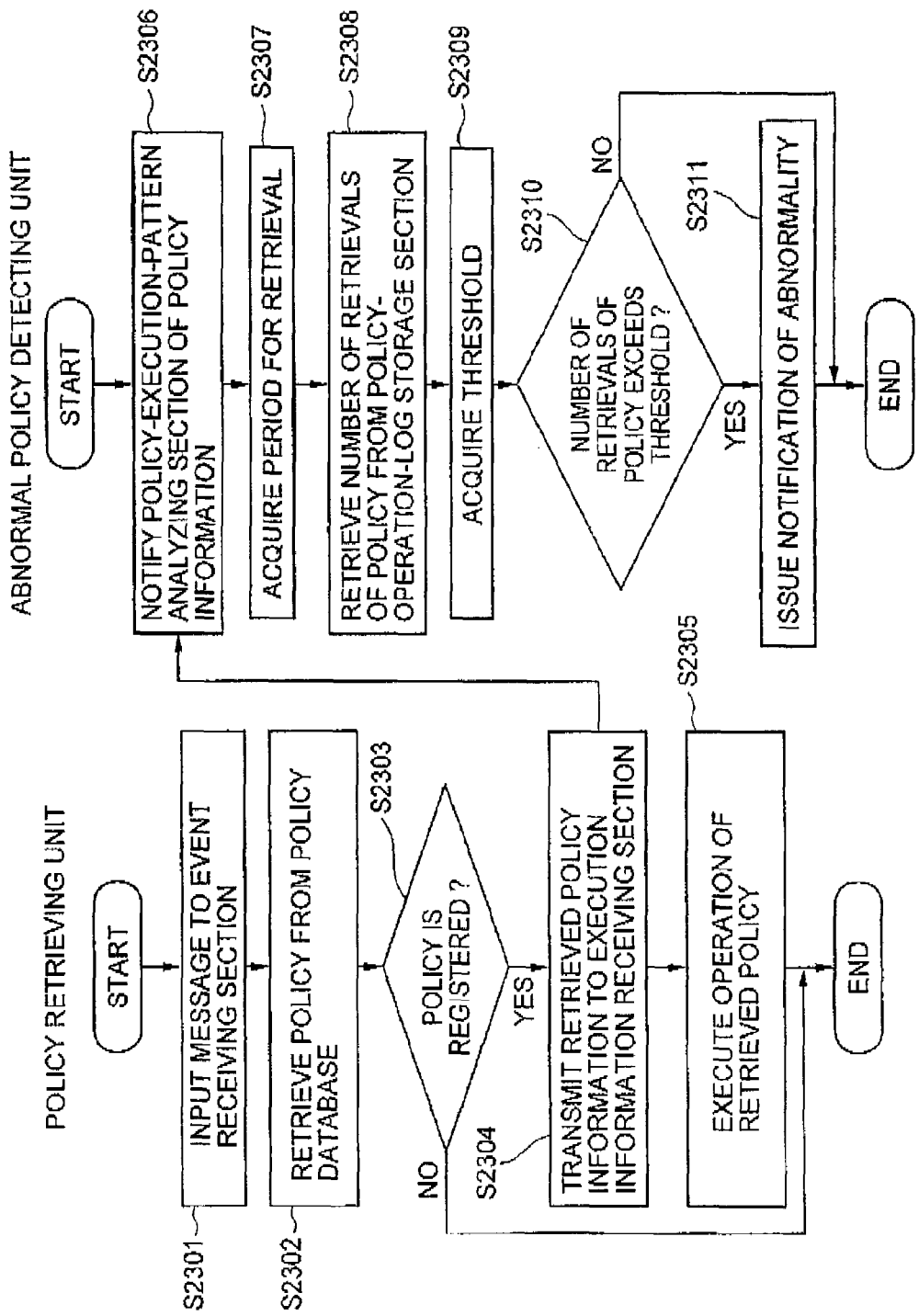
FIG. 23 is a flowchart showing an operation procedure of the policy handling system 100g.

FIG. 23 shows an operation procedure of the policy handling system 100g. Each of the policy retrieving units 10, 11 and 12 performs operation similar to the operation of steps S1601 to S1603 of FIG. 16 to receive an event generated in the management-targeted device and retrieve a policy having a triggering condition which is satisfied by the generated event (step S2301 to S2303). After the policy is retrieved by the policy retrieving section 102, the policy handling system 100g causes the policy-execution-information notifying section 109 to transmit information of the retrieved policy to the abnormal-policy detecting unit 20 (step S2304), and executes the operation of the retrieved policy (step S2305).

The abnormal-policy detecting unit 20 receives, in the policy-execution-information receiving section 201, the information of the retrieved policy transmitted from any of the policy retrieving units 10, 11, and 12 and notifies the policy-execution-pattern analyzing section 105 of the received information (step S2306). Thereafter, the policy handling system 100g performs operation similar to the operation of steps S204 to S209 of FIG. 2, to refer to the policy-operation-log storage section 107 acquire the number of triggering times of the retrieved policy, check whether or not the number of triggering times exceeds the threshold and, if the number of triggering times exceeds the threshold, notifies the administrator or the like of information indicating that an abnormality occurs in the policy operation (steps S2307 to 2311).

Hereinafter, a description will be given in more detail using a concrete example. It is assumed that the policy database 104 of the policy retrieving units 10, 11, and 12 stores policies shown in FIGS. 24, 25, and 26, respectively. It is also assumed here that the event receiving section 101 of the policy retrieving unit 10 has received an event [server="serverA", state-no#response]. In this case, in step S2302, a policy "PolicyI" having a triggering condition which is satisfied by the event is retrieved. Further, in step S2304, the policy-execution-information notifying section 109 transmits the ID "PolicyI" of the retrieved policy, and the triggering time "3/21 22:02:25" thereof to the abnormal-policy detecting unit 20.

Upon receiving the information of the retrieved policy in step S2306, the policy-execution-pattern analyzing section 105 inquires the policy-operation-log retrieving section 106 as to the number of triggering times of a policy approximating the "PolicyI". The policy-operation-log retrieving section 106 determines e.g., "40 seconds" as the history acquisition period according to the previously prepared setting file in step S2307. The policy-operation-log retrieving section 106e acquires an operation log corresponding to the determined history period, "40 seconds", from the policy-operation-log storage section 107 and then, counts the number of triggering times of the policy approximating the "PolicyI" included in the acquired operation log.

In the calculation of the approximation degree between policies, "1" is set when the operation targets coincide with each other, and "1" is further set when the methods thereof coincide with each other. That is, when either the operation targets or the methods coincide with each other, the approximation degree is set to "1"; whereas when the operation targets and methods respectively coincide, the approximation degree is set to "2". In this case, the policy-operation-log retrieving section 106e regards a policy having an approximation degree of "1" or more as the policy approximating the retrieved policy. Since the operation target of the "PolicyI" is "serverA" and method thereof is "to restart", "PolicyI", "PolicyJ", "PolicyK", and "PolicyL" are extracted as policies approximating the "PolicyI" retrieved in the policy retrieving unit 10 from policies shown in FIGS. 24 to 26. When the acquired operation log has the content shown in FIG. 27, the number of triggering times of the policies approximating the "PolicyI" is "7".

In step S2309, the policy-execution-pattern analyzing section 105 determines, e.g., "5" as the threshold according to the previously prepared setting file. When comparing in step S2310 the threshold "5" and number "7" of triggering times of the policies approximating the "PolicyI" which is acquired in step S2308, it can be seen that the number of triggering times exceeds the threshold. Accordingly, in step S2310, a notification indicating that an abnormality occurs in the policy operation is issued to the administrator or the like through, e.g., E-mail.

In the present embodiment, the policy handling system is divided into the following units: the policy retrieving units 10, 11, 12 each for retrieving and executing a policy, and abnormal-policy detecting unit 20 for detecting an abnormality in the policy operation. With this configuration, it is possible to detect an abnormality caused by a chain of policies under an environment where the policy handling is performed at a plurality of remote locations, e.g., the environment where a plurality of policy retrieving units 10, 11, and 12 are prepared for respective management-targeted devices in order to perform the policy handling.

Figure 28:
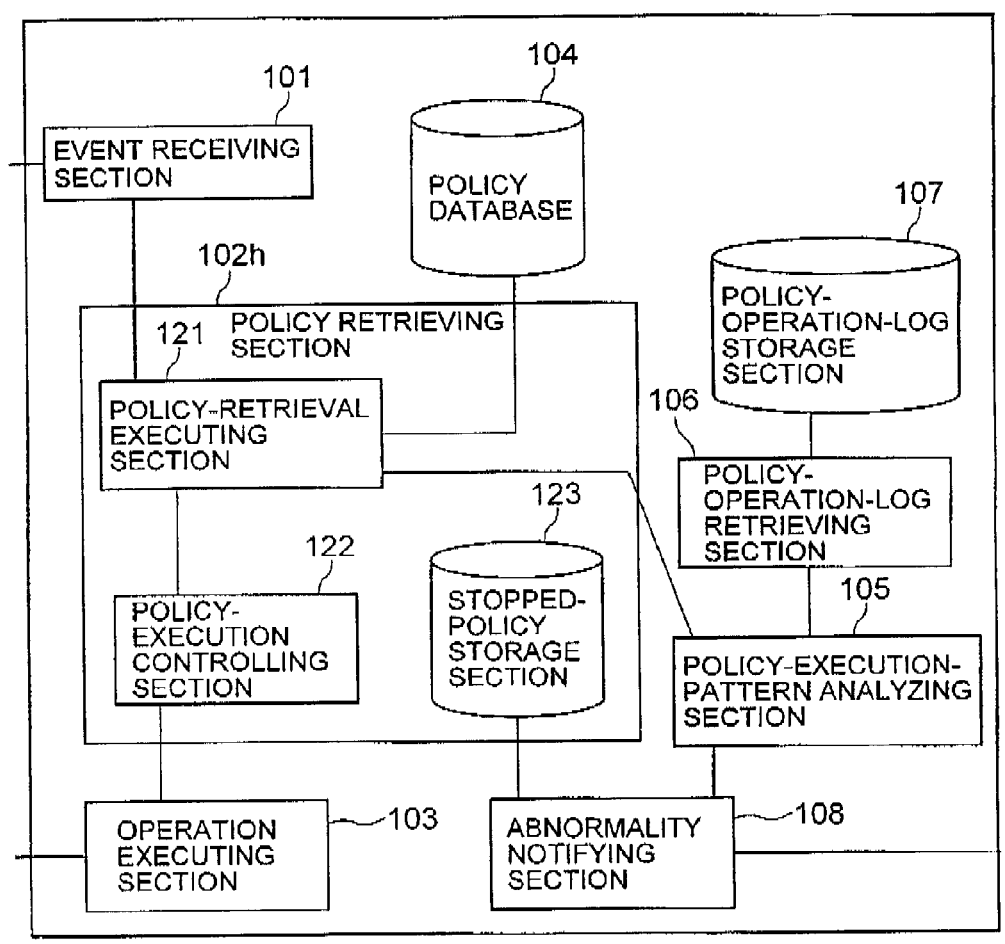
FIG. 28 is a block diagram showing the configuration of a policy handling system according to a ninth embodiment of the present invention.

FIG. 28 shows the configuration of a policy handling system according to a ninth embodiment of the present invention. The policy handling system 100h of the present embodiment differs from the policy handling system 100 of the first embodiment shown in FIG. 1 in that the policy retrieving section 102h further includes a policy-execution controlling section 122 and a stopped-policy storage section 123. The stopped-policy storage section 123 stores therein policies for which the trigger is suppressed. The policy-execution controlling section 122 prevents the triggering of a policy retrieved by the policy-retrieval executing section 121 when the policy coincides with a policy stored in the stopped-policy storage section 123.

Figure 29:
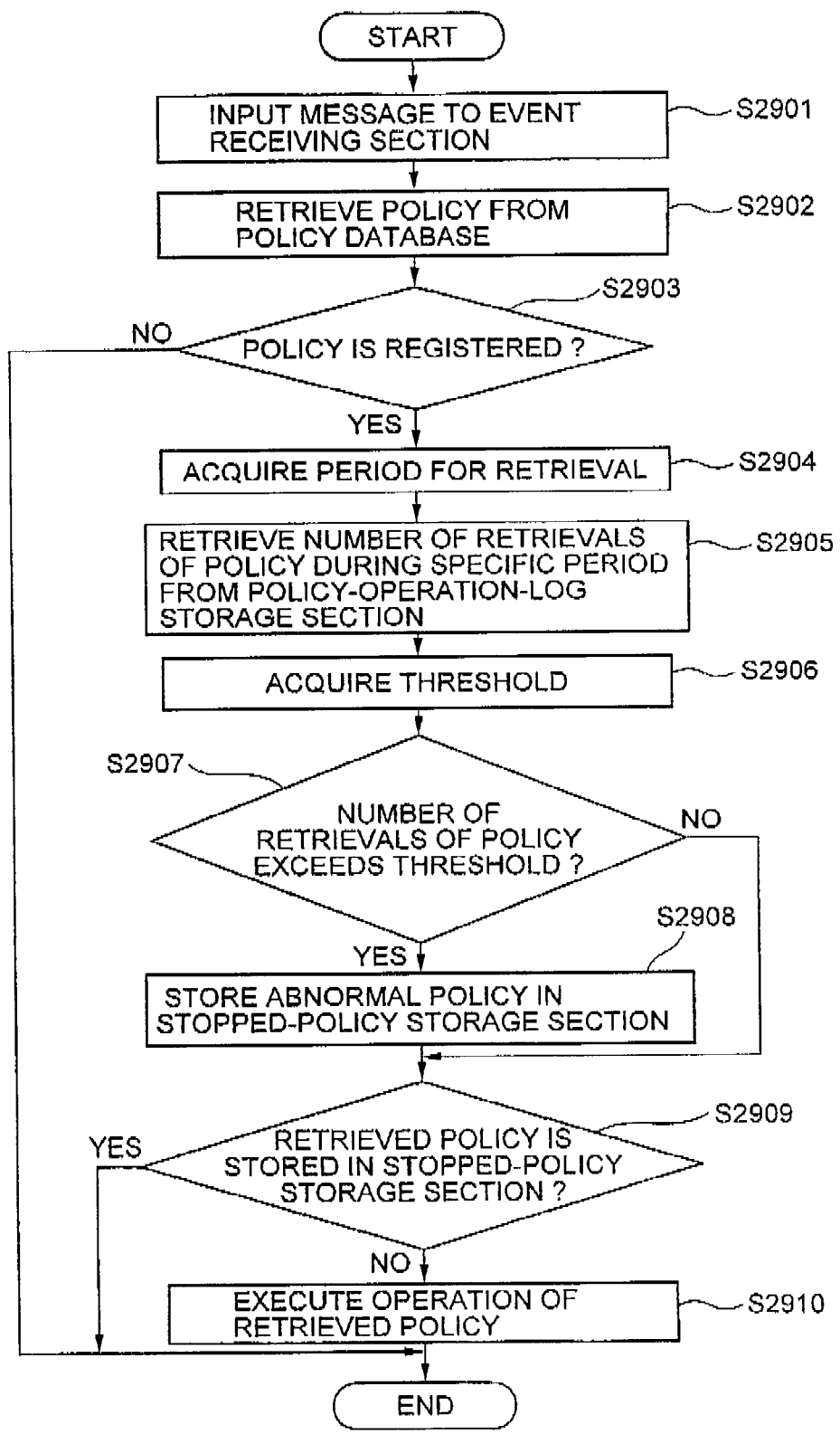
FIG. 29 is a flowchart showing an operation procedure of the policy handling system 100h.

FIG. 29 shows an operation procedure of the policy handling system 100h. The policy handling system 100h performs operation similar to the operation of steps S201 to S207 of FIG. 2, to retrieve a policy to be triggered in association with the received event, acquire the number of triggering times of the policy, and check whether the number of triggering times exceeds the threshold (step S2901 to S2907). When the number of triggering times does not exceed the threshold, the process advances to step S2090.

When determining that the number of triggering times exceeds the threshold, the policy-execution-pattern analyzing section 105 notifies the abnormality notifying section 108 of information indicating that an abnormality occurs in the policy operation. Upon receiving the information, the abnormality notifying section 108 notifies the administrator or the like of corresponding information and registers the policy retrieved in step S2902 in the stopped-policy storage section 123 (step S2908).

The policy-execution controlling section 122 determines whether or not the policy retrieved in step S2902 is stored in the stopped-policy storage section 123 (step S2909). When determining that the policy retrieved in step S2902 is not stored in the stopped-policy storage section 123, the policy-execution controlling section 122 passes the retrieved policy to the policy executing section 103 to cause the policy executing section 103 to execute the operation of the retrieved policy (step S2910). When determining that the policy retrieved in step S2902 is stored in the stopped-policy storage section 123, the policy-execution controlling section 122 ends the processing so as to suppress the operation of the policy from being executed.

In the present embodiment, a policy having an operation which is determined to be abnormal by the policy-execution-pattern analyzing section 105 is stored in the stopped-policy storage section 123, so as to suppress the operation of the policy from being executed. With this configuration, it is possible to automatically stop the policy causing an abnormal operation, thereby suppressing an abnormality from spreading.

Figure 30:
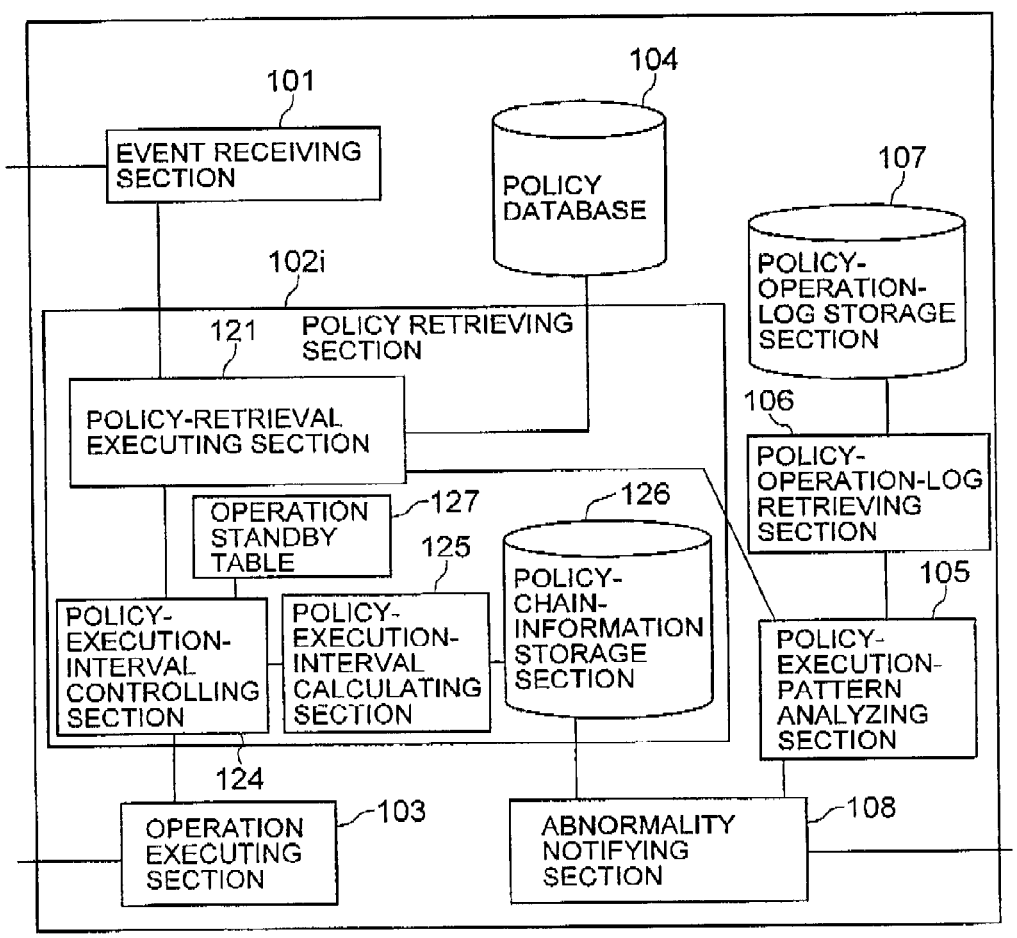
FIG. 30 is a block diagram showing the configuration of a policy handling system according to a tenth embodiment of the present invention.

FIG. 30 shows the configuration of a policy handling system according to a tenth embodiment of the present invention. The policy handling system 100i of the present embodiment differs from the policy handling system 100 of the first embodiment shown in FIG. 1 in that a policy retrieving section 102i further includes a policy-execution-interval controlling section 124, a policy-execution-interval calculating section 125, a policy-chain-information storage section 126, and an operation standby table 127. The policy-chain-information storage section 126 stores a policy having an operation which is determined to be abnormal by the policy-execution-pattern analyzing section 105, execution frequency of the policy, and last triggering time of the policy in association with one another. The policy-execution-interval calculating section 125 calculates the time interval of executions of the policy based on the operation frequency stored in the policy-chain-information storage section 126.

The policy-execution-interval controlling section 124 calculates estimated execution time instant based on the time interval calculated by the policy-execution-interval calculating section 125. If the calculated estimated execution time instant indicates a time instant before the present time, the policy-execution-interval controlling section 124 notifies the policy executing section 103 to cause the policy executing section 103 to execute the operation of the policy. The operation standby table 127 stores a policy and estimated execution time thereof in association with each other. If the calculated estimated execution time instant indicates a time instant after the present time, the policy-execution-interval controlling section 124 registers the estimated execution time instant in the operation standby table 127 so as to delay the execution of the operation of the retrieved policy until the estimated execution time instant.

Figure 31:
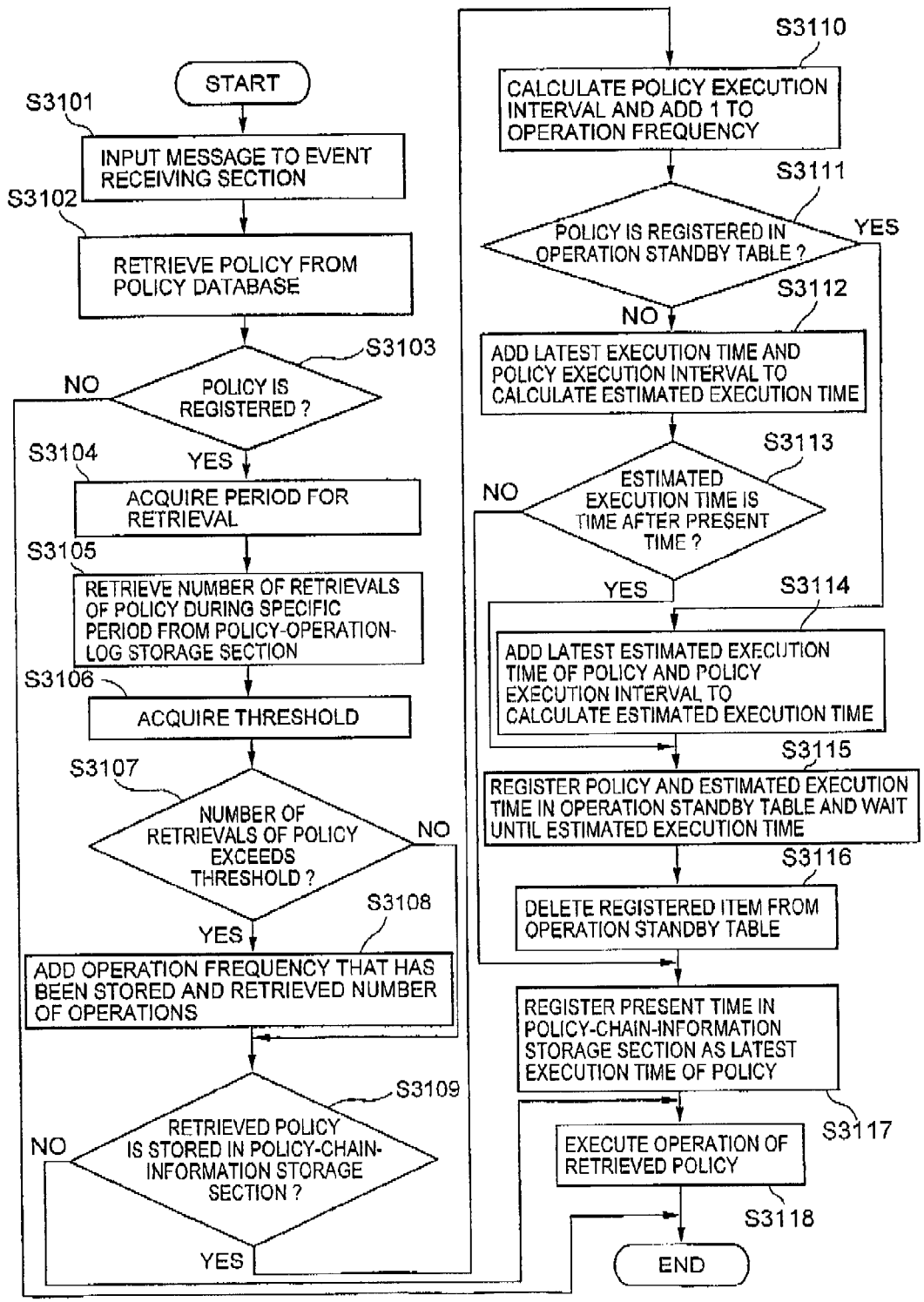
FIG. 31 is a flowchart showing an operation procedure of the policy handling system 100i.

FIG. 31 shows an operation procedure of the policy handling system 100i. The policy handling system 100i performs operation similar to the operation of steps S201 to S207 of FIG. 2, to retrieve a policy having a triggering condition which is satisfied by a received event, acquire the number of triggering times of the policy, and check whether or not the number of triggering times exceeds the threshold (step S3101 to S3107). When the number of triggering times does not exceed the threshold, the process advances to step S3109.

When determining that the number of triggering times exceeds the threshold, the policy-execution-pattern analyzing section 105 notifies the abnormality notifying section 108 of information indicating that an abnormality occurs in the policy operation. Upon receiving the information, the abnormality notifying section 108 notifies the administrator or the like of corresponding information and stores information of the policy retrieved in step S3102 in the policy-chain-information storage section 126 (step S3108). In step S3108, the abnormality notifying section 108 adds the number of triggering times acquired in step S3105 to the operation frequency that has been registered in the policy-chain-information storage section 126, and registers the addition result as a new operation frequency.

The policy-execution-interval controlling section 124 receives the policy retrieved in step S3102. The policy-execution-interval calculating section 125 uses the policy received by the policy-execution-interval controlling section 124 as a key to search the policy-chain-information storage section 126 and determines whether or not information of the retrieved policy is registered in the policy-chain-information storage section 126 (step S3109). When it is determined that the information of the retrieved policy is not registered, the process advances to step S3118.

When determining that the information of the retrieved policy is registered, the policy-execution-interval calculating section 125 acquires the operation frequency from the policy-chain-information storage section 126 and, based on the operation frequency, calculates the time interval of executions of the policy (step S3110). For example, in this calculation of the execution interval of the policy, operation frequency×1 is set to the time interval (sec). Then, 1 is added as the number corresponding to the current execution to the operation frequency registered in the policy-chain-information storage section 126.

The policy-execution-interval controlling section 124 checks whether or not the same policy as that retrieved in step S3102 is registered in the operation standby table 127 (step S3111). When determining that the same policy is not registered, the policy-execution-interval controlling section 124 acquires the latest execution time instant of the retrieved policy from the policy-chain-information storage section 126, and adds the time interval calculated in step S3110 to the latest execution time instant to calculate estimated execution time instant (step S3112). If the latest execution time instant is not registered, the policy-execution-interval controlling section 124 adds the time interval calculated in step S3110 to the present time to calculate estimated execution time instant.

The policy-execution-interval controlling section 124 checks whether or not the estimated execution time instant calculated in step S3111 is a time instant after the present time, i.e., whether or not the estimated execution time instant is a future time relative to the present time (step S3113). When it is determined that the estimated execution time instant is a time after the present time, the process advances to step S3115, whereas when it is determined that the estimated execution time instant is a time before the present time, the process advances to step S3117.

When determining, in step S3111, that the same policy as retrieved in step S3102 is registered in the operation standby table 127, the policy-execution-interval controlling section 124 acquires the latest estimated execution time instant among the estimated execution time instants of the policy registered in the operation standby table 127 to acquire the latest one. Thereafter, the policy-execution-interval controlling section 124 adds the execution interval calculated in step S3110 to the latest estimated execution time instant to calculate an estimated execution time instant (step S3114).

The policy-execution-interval controlling section 124 registers, in the operation standby table 127, the policy retrieved in step S3102 and estimated execution time instant calculated in step S3112 or S3114 (step S3115). The policy-execution-interval controlling section 124 waits until the present time reaches the estimated execution time instant registered in the operation standby table 127. When the present time reaches the estimated execution time instant, the policy-execution-interval controlling section 124 deletes the item of the policy corresponding to the estimated execution time instant from the operation standby table 127 (step S3116), and registers the present time in the policy-chain-information storage section 126 as the latest execution time instant of the retrieved policy (step S3117). Thereafter, the policy-execution-interval controlling section 124 passes the retrieved policy to the policy executing section 103 to allow the policy executing section 103 to execute the operation of the retrieved policy (step S3118).

Hereinafter, a description will be provided in more detail using a concrete example. It is assumed that the policy database 104 stores the policies shown in FIG. 32. It is also assumed that the event receiving section 101 has received an event [server="serverA", cpuload=93] in step S3101. In this case, in step S3102, "PolicyO" having a triggering condition which is satisfied by the event is retrieved. If the number of triggering times of the "PolicyO" exceeds the threshold, the number of triggering times of the policy which is acquired in step S3105 is added to the operation frequency registered in the policy-chain-information storage section 126.

If information of the "PolicyO" is registered in the policy-chain-information storage section 126, it is determined, in step S3109, that the information of the "PolicyO" is registered in the policy-chain-information storage section 126. When the policy-chain-information storage section 126 stores the information shown in FIG. 33, the policy-execution-interval calculating section 125 acquires, in step S3110, "52" as the operation frequency of the "PolicyO" and determines "52 seconds" as the execution time interval. Further, the policy-execution-interval calculating section 125 adds "1" to the operation frequency, to update the operation frequency to "53".

In step S3111, the policy-execution-interval controlling section 124 determines whether or not the "PolicyO" is registered in the operation standby table 127. When the operation standby table 127 stores the information shown in FIG. 34, the process advances to step S3114 where the policy-execution-interval controlling section 124 calculates the estimated execution time instant of the "PolicyO". In FIG. 34, "3/21 11:27:41" and "3/21 11:28:32" are registered as the estimated execution time of the "PolicyO". In step S3114, the policy-execution-interval controlling section 124 adds the estimated execution time interval "52 seconds" determined in step S3110 to the later estimated execution time ("3/21 11:28:32") to calculate "3/21 11:29:24" as new estimated execution time instant.

In step S3115, the policy-execution-interval controlling section 124 registers the "PolicyO" and the estimated execution time instant "3/21 11:29:24" thereof in the operation standby table 127. When the present time reaches, e.g., "3/21 11:27:41", the policy-execution-interval controlling section 124 deletes the item of "PolicyO" registered in the operation standby table 127 in step S3116, registers the latest execution time in the policy-chain-information storage section 126 (FIG. 33) in step S3117, and causes the policy executing section 103 to execute the operation of the "PolicyO" in step S3118. With regard to the remaining items registered in the operation standby table 127, the policy-execution-interval controlling section 124 performs a deletion processing from the operation standby table 127 each time the present time reaches the estimated execution time instant and causes the policy executing section 103 to execute a policy corresponding to each item.

In the present embodiment, the policy-execution-interval controlling section 124 prevents a policy registered in the policy-chain-information storage section 126 from being executed at a smaller time interval than a time interval set based on the operation frequency. With this configuration, it is possible to limit the number of execution times of the policy per unit time, thereby reducing the speed at which an abnormality caused by a chain of policies spreads. This increases the time length required for the administrator to deal with the abnormality.

Figure 35:
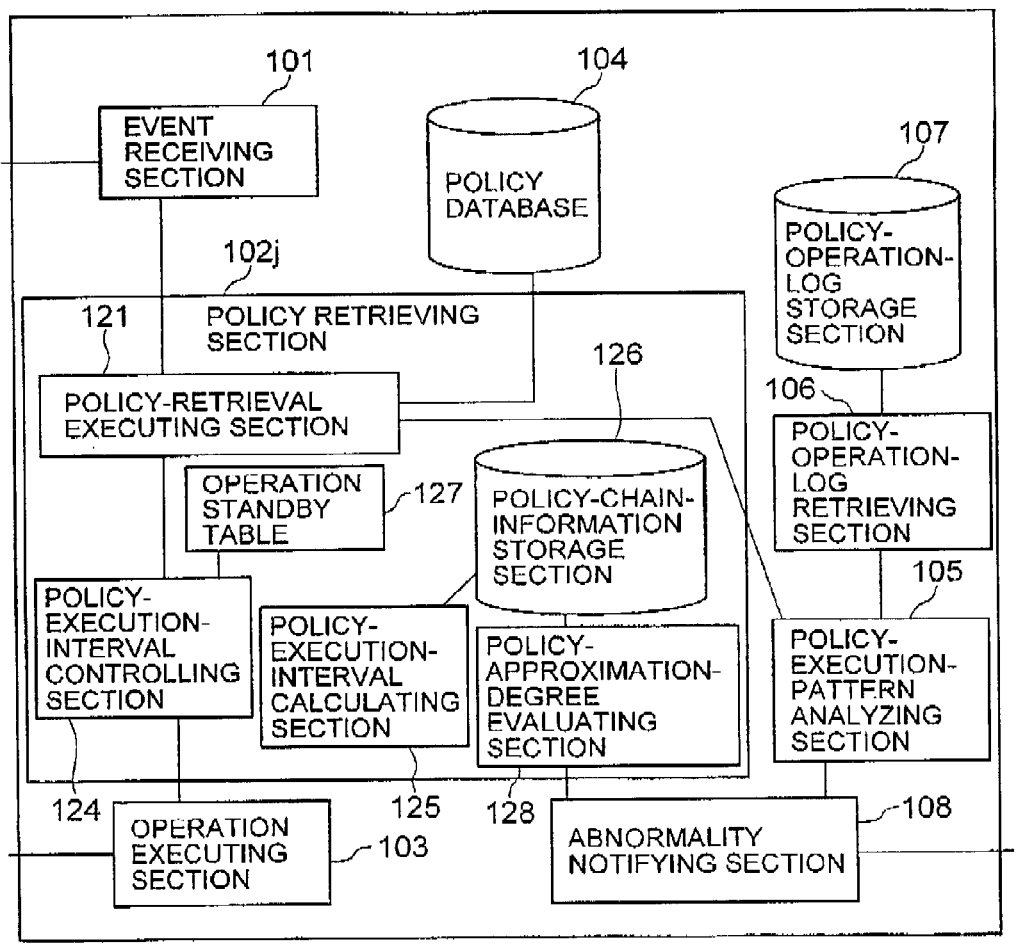
FIG. 35 is a block diagram showing the configuration of a policy handling system according to an eleventh embodiment of the present invention.

FIG. 35 shows the configuration of a policy handling system according to an eleventh embodiment of the present invention. The policy handling system 100j of the present embodiment differs from the policy handling system 100i of the tenth embodiment in that a policy retrieving section 102j further includes a policy-approximation-degree evaluating section 128. The policy-approximation-degree evaluating section 128 calculates the degree of approximation between policies based on the triggering condition of the policy, operation target of the policy and type thereof, and a method invoked by the policy, regards a policy having a high approximation degree as the same as the policy retrieved by the policy retrieving section 102j, and registers the policy approximating the retrieved policy in the policy-chain-information storage section 126, if the operation of the retrieved policy is determined to be abnormal.

Figure 36:
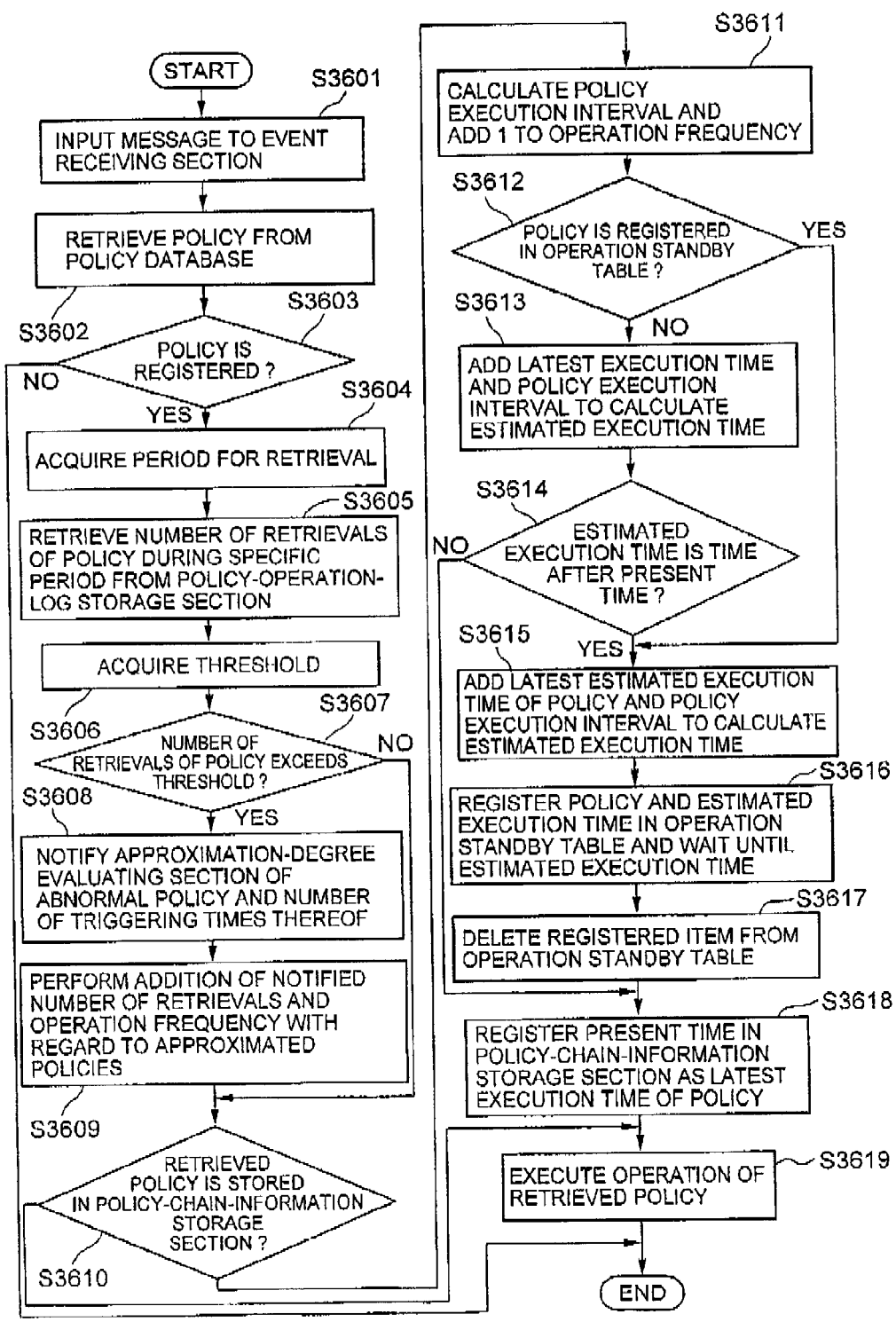
FIG. 36 is a flowchart showing an operation procedure of the policy handling system 100j.

FIG. 36 shows an operation procedure of the policy handling system 100j. The policy handling system 100j performs operation similar to the operation of steps S3101 to S3107 of FIG. 31, to retrieve a policy having a triggering condition which is satisfied by a received event, acquire the number of triggering times of the policy, and check whether or not the number of triggering times exceeds the threshold (step S3601 to S3607). When the number of triggering times does not exceed the threshold, the process advances from step S3607 to step S3610.

When determining in step S3607 that the number of triggering times exceeds the threshold, the policy-execution-pattern analyzing section 105 notifies the abnormality notifying section 108 of information indicating that an abnormality occurs in the policy operation. Upon receiving the information, the abnormality notifying section 108 notifies the administrator or the like of corresponding information and notifies the policy-approximation-degree evaluating section 128 of the policy retrieved in step S3602 and number of triggering times acquired in step S3605 (step S3608). The policy-approximation-degree evaluating section 128 searches the policy database 104 to retrieve a policy having a high degree of approximation to the policy retrieved in step S3602. Thereafter, with regard to the retrieved policy and policy approximating the retrieved policy, the policy-approximation-degree evaluating section 128 performs addition of the notified number of triggering times and the operation frequency and registers the addition results in the policy-chain-information storage section 126 (step S3609). The processing subsequent to step S3609 is similar to that shown in FIG. 31.

In the present embodiment a chain of operations of approximating policies can be prevented. As a result, it is possible to reduce the speed at which the abnormality caused by a chain of policies spreads more accurately. This increases the time length during which the administrator is allowed to deal with the abnormality.

Figure 37:
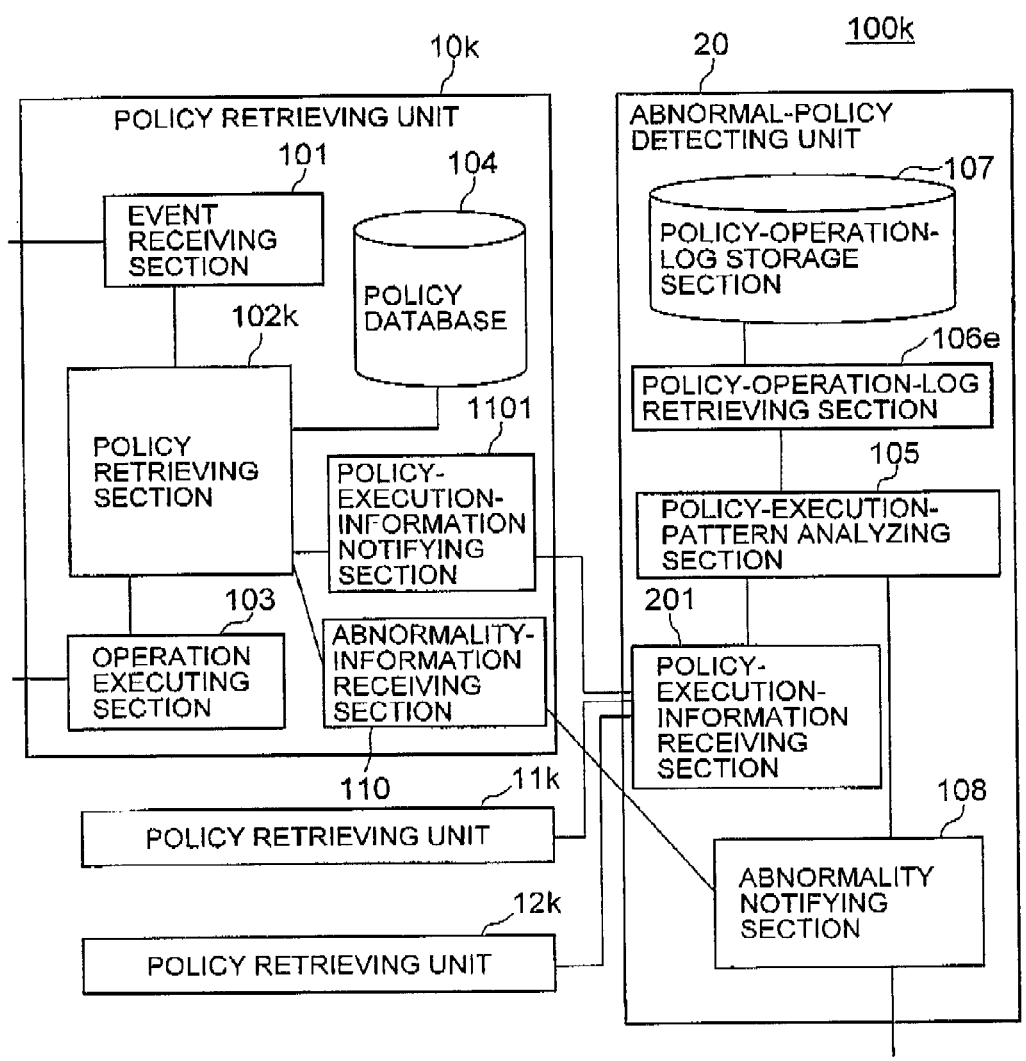
FIG. 37 is a block diagram showing the configuration of a policy handling system according to a twelfth embodiment of the present invention.

FIG. 37 shows the configuration of a policy handling system according to a twelfth embodiment of the present invention. The policy handling system 100k includes policy retrieving units 10k, 11k, 12k, and abnormal-policy detecting unit 20. Each of the policy retrieving units 10k, 11k and 12k has an abnormality-information receiving section 110 in addition to the components of each of the policy retrieving units 10, 11, and 12 in the eighth embodiment shown in FIG. 22. A policy retrieving section 102k of each of the policy retrieving units 10k, 11k, and 12k has a configuration similar to that of the policy retrieving section 102h in the ninth embodiment shown in FIG. 28.

Figure 38:
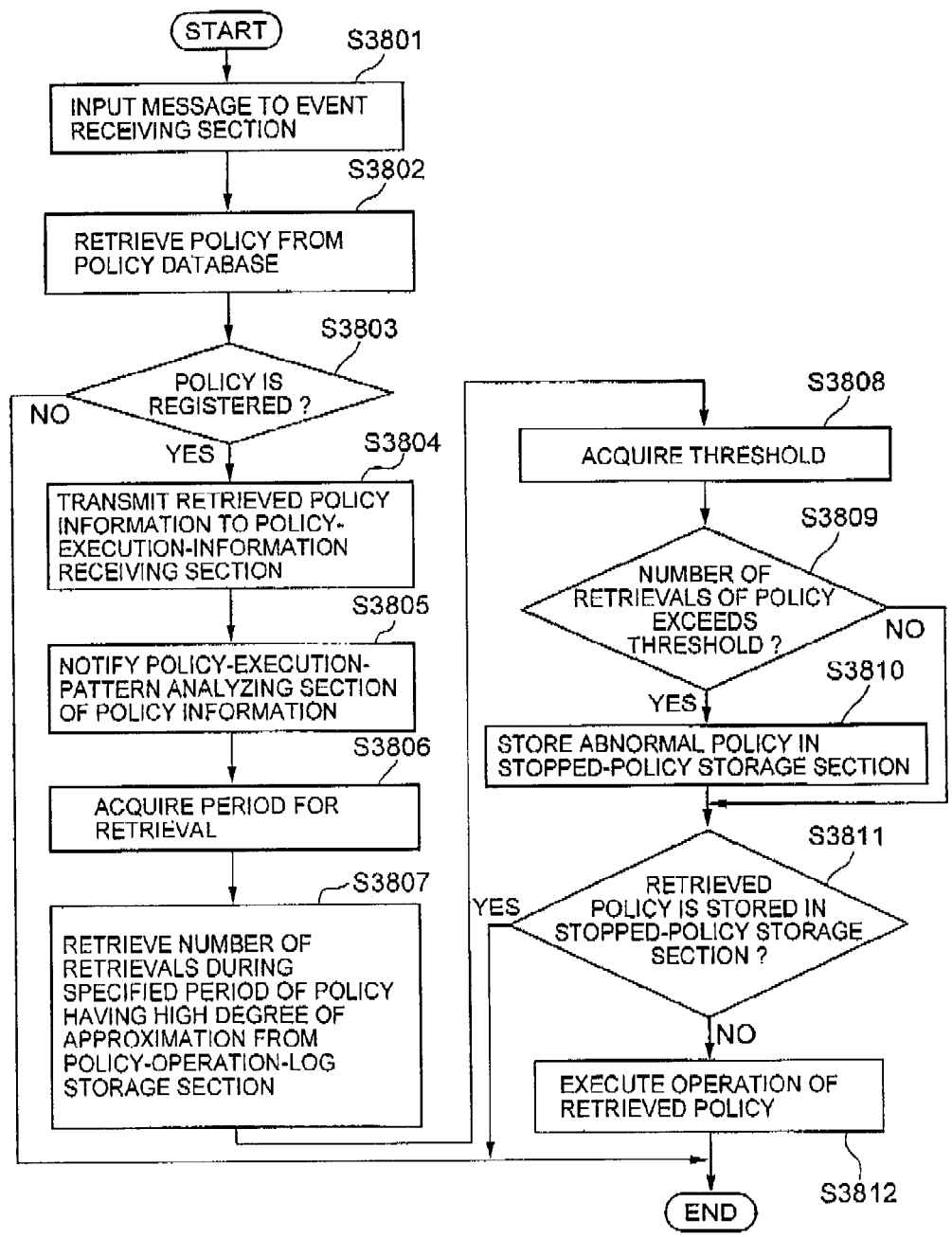
FIG. 38 is a flowchart showing an operation procedure of the policy handling system 100k.
Figure 39:
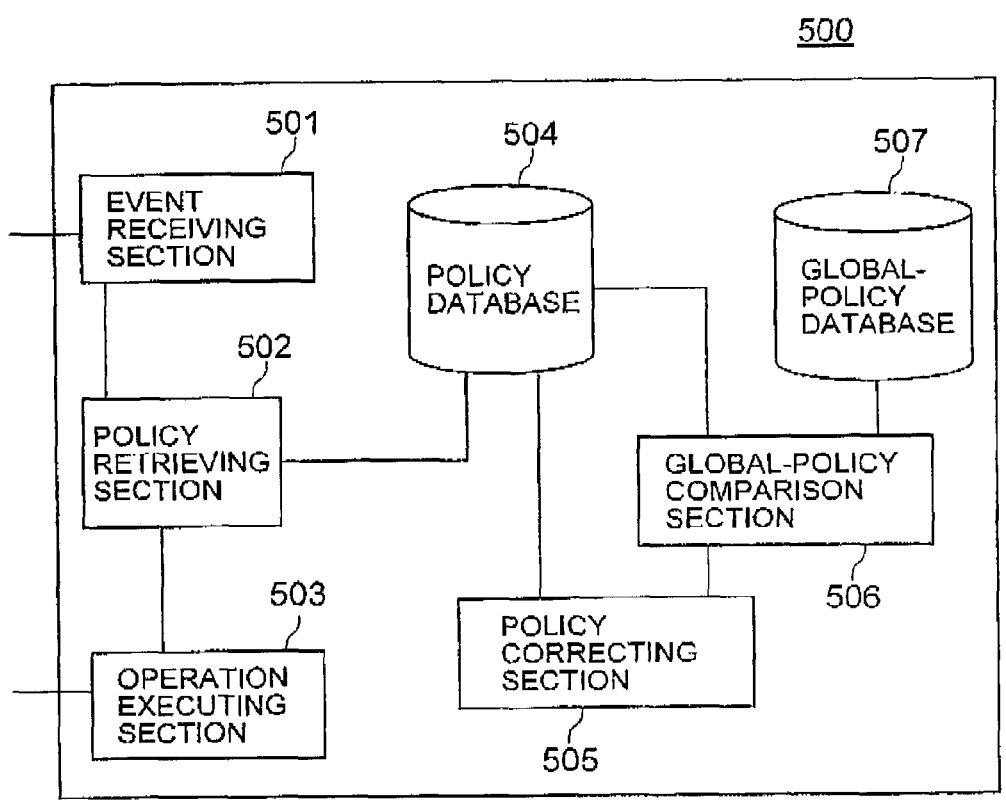
FIG. 39 is a block diagram showing the configuration of a conventional general computer system in which a CPU and an exclusive processing section are allowed to cooperate with each other.

FIG. 38 shows an operation procedure of the policy handling system 100k. Each of the policy retrieving units 10k, 11k, and 12k performs operation similar to the operation of steps S2301 to S2304 of FIG. 23 to retrieve a policy having a triggering condition which is satisfied by a received event and transmit the retrieved policy to the abnormal-policy detecting unit 20 (steps S3801 to S3804). Thereafter, the abnormal-policy detecting unit 20 performs operation similar to the operation of steps S2306 to S2310 to acquire the number of triggering times of policies approximating the retrieved policy and check whether or not the acquired number of triggering times exceeds a threshold (steps S3805 to S3709).

When it is determined that the number of triggering times exceeds the threshold, the abnormality notifying section 108 notifies the administrator or the like of occurrence of an abnormality. At the same time, the abnormality notifying section 108 notifies the policy having an operation determined to be abnormal to the abnormality-information receiving section 110 of each of the policy retrieving units 10k, 11k, and 12k. The abnormality-information receiving section 110 stores the notified policy in the stopped-policy storage section 123 (FIG. 28) (step S3810). Each of the policy processing units 10k, 11k, and 12k performs operation similar to the operation of steps S2909 and S2910 shown in FIG. 29 to check whether or not the policy retrieved in step S3802 is registered in the stopped-policy storage section 123 and, when the retrieved policy is not registered, executes the operation of the retrieved policy (steps S3811 and S3812).

In the present embodiment, each of the policy retrieving units 10k, 11k, and 12k receives, in the abnormality-information receiving section 110, information indicating that an abnormality occurs in the policy operation which is detected by the abnormal-policy detecting unit 20, and stores the policy having an operation determined to be abnormal in the stopped-policy storage section 123. With this configuration, it is possible to prevent the abnormality caused by a chain of policies even if the policy handling system is divided into the sections: section that retrieves a policy and executes the retrieved policy, and section that detects an abnormality in the policy operation.

The operations of the policy handling system 100 described in the above respective embodiments may be combined appropriately. For example, a configuration may be adopted in which the second and fourth embodiments are combined to determine occurrence of an abnormality in the policy operation based on whether or not the number of triggering times of a policy during the history acquisition period corresponding to the policy exceeds the threshold corresponding to the policy. Further, a configuration may be adopted in which the eighth and tenth embodiments or eighth and eleventh embodiments are combined in the twelfth embodiment to register a policy having an operation which is determined to be abnormal in the policy-chain-information storage section 126 so as to prevent a chain of the policy operations.

Although the present invention has been described with reference to the preferred embodiments, the policy handling system and method according to the present invention are not limited to the above embodiments, and policy handling system and method obtained by making various modifications and changes in the configurations of the above embodiments will fall in the scope of the present invention.

INDUSTRIAL APPLICABILITY

The policy handling system and method according to present invention can be applied in order to achieve autonomous management for devices connected to the system through a network and can further be applied in order to automatically assign resources in accordance with a service load.

The invention claimed is:

1. A policy handling system, for managing a management-targeted system based on at least two or more policies, each of which includes description of a triggering condition for triggering the policy and operation to be executed after triggering, the system comprising:
    at least one processor; and
    a policy-operation-log storage unit which stores ID of a triggered policy and triggered time in association with each other;
    wherein the at least one processor comprises an abnormality detecting unit which comprises:
        a policy-operation-log retrieving section configured to receive a notification of a satisfied policy having a triggering condition which is satisfied and subsequently refer to the policy-operation-log storage unit to acquire a triggered frequency of said satisfied policy;
        a policy-execution-pattern analyzing section configured to determine whether or not said satisfied policy is abnormal based on the triggered frequency of said satisfied policy acquired by the policy-operation-log retrieving section; and
        an operation executing section configured to execute operation of said satisfied policy when said satisfied policy is determined normal and to stop executing operation of said satisfied policy when said satisfied policy is determined abnormal.

2. A policy handling system for managing a management-targeted system based on at least two or more policies, each of which includes description of a triggering condition for triggering the policy and operation to be executed after triggering, the system comprising:

at least one processor; and a policy-operation-log storage unit which stores ID of a triggered policy and triggered time in association with each other;

wherein the processor comprises an abnormality detecting unit which comprises:

a policy-operation-log retrieving section configured to receive a notification of a satisfied policy having a triggering condition which is satisfied and subsequently refer to the policy-operation-log-storage unit to acquire a triggered frequency of said satisfied policy;

a policy-execution-pattern analyzing section configured to determine whether or not said satisfied policy is abnormal based on the triggered frequency of said satisfied policy acquired by the policy-operation-log retrieving section;

an operation executing section configured to execute the operation of said satisfied policy when said satisfied policy is determined normal; and an output unit comprising an abnormality notifying section configured to output a notification that an abnormality occurs in said satisfied policy operation when said satisfied policy is determined abnormal.

3. The policy handling system according to claim 1 or 2, wherein the policy-operation-log retrieving section acquires a number of triggering times of said satisfied policy during a history acquisition period before receiving the notification, and the policy-execution-pattern analyzing section determines that said satisfied policy is abnormal when the number of triggering times of said satisfied policy during the history acquisition period exceeds a predetermined threshold.

4. The policy handling system according to claim 3, further comprising a history acquisition period storage unit which stores a policy and a history acquisition period in association with each other;

wherein the policy operation-log retrieving section comprises a history-acquisition-period acquisition section configured to refers to the history acquisition period storage unit and to acquire the history acquisition period of said satisfied policy.

5. The policy handling system according to claim 4, wherein the policy operation-log retrieving section further comprises a history-acquisition period calculation section configured to calculate an average and a variance of at least one of a past triggered frequency and a triggering time interval, to calculate the history acquisition period based on the calculated average and variance, and to store the obtained history acquisition period in the history acquisition-period storage unit.

6. The policy handling system according to claim 3, further comprising a policy-triggering-count-threshold storage unit which stores a policy and a threshold in association with each other;

wherein the policy execution-pattern analyzing section comprises a policy-triggering-count-threshold acquisition section configured to refer to the policy-triggering-count-threshold storage unit, and to acquire the threshold.

7. The policy handling system according to claim 6, wherein the policy execution-pattern analyzing section comprises a policy-triggering-count-threshold calculation section configured to calculate an average and a variance of a number of triggering times of said satisfied policy during a specific period, to calculate the threshold based on the calculated average and variance, and to store the calculated threshold in the policy-triggering-count-threshold storage unit.

8. The policy handling system according to claim 1 or 2, wherein the policy-operation-log retrieving section comprises a policy-approximation-degree evaluating section configured to determine a degree of approximation between policies based on at least one of the triggering condition and an operation to be executed, and the policy-approximation-degree evaluating section is configured to regard an approximating policy, determined to be approximating said satisfied policy, as the same as said satisfied policy, to acquire, from the policy-operation-log storage unit, a number of triggering times of the approximating policy.

9. The policy handling system according to claim 1 or 2, further comprising a policy flag table which stores said satisfied policy and an influence-degree flag indicating whether or not policy operation abnormality determination processing needs to be performed for said satisfied policy;

wherein the policy-execution-pattern analyzing section comprises a policy flag evaluating section configured to refer to the policy flag table, and to determine whether or not said satisfied policy is abnormal.

10. The policy handling system according to claim 1 or 2, further comprising a policy database which stores policies;

wherein the at least one processor further comprises a policy executing unit comprising:

an event monitoring section configured to monitor an event generated in a management-targeted system; and a policy retrieving section configured to refer to the policy database when the event monitoring section detects occurrence of an event corresponding to the triggering condition, and to retrieve said satisfied policy and notify the policy operation-log retrieving section of the retrieved policy.

11. The policy handling system according to claim 10, wherein the policy retrieving section is configured to store the retrieved policy and a retrieval time instant of thereof in the policy operation-log storage unit in association with each other.

12. The policy handling system according to claim 10, wherein the at least one processor further comprises a plurality of the policy executing unit, which are connected to the abnormality detecting unit through a communication line.

13. The policy handling system according to claim 10, further comprising a stopped-policy storage unit which stores a policy for which a trigger is to be stopped;

wherein the policy execution-pattern analyzing section is further configured to store a policy determined to be abnormal in the stopped-policy storage section, and the policy retrieving section comprises a policy-execution controlling section configured to refer to the stopped-policy storage unit and to determine whether or not triggering of said satisfied policy is to be stopped.

14. The policy handling system according to claim 10, further comprising a policy chain information storage unit;

wherein the policy-execution-pattern analyzing section is further configured to register a policy determined to be abnormal in the policy chain information storage unit in association with the triggered frequency and a latest execution time instant of the policy.

15. The policy handling system according to claim 14, wherein the policy retrieving section comprises a policy-execution-interval controlling section configured to calculate, if the retrieved policy has been registered in the policy-chain-information storage unit, an estimated execution time instant of the retrieved policy based on the execution frequency and a latest execution time of the retrieved policy stored in the policy-chain-information storage unit, and causes the operation executing section to delay execution of the retrieved policy until the calculated estimated execution time.

16. The policy handling system according to claim 15, wherein the policy retrieving section is further configured to register the policy for which execution is stopped and estimated execution time instant of the policy in an operation standby table in association with each other, and to cause the operation executing section to execute the policy of which the execution is stopped at the estimated execution time instant registered in the operation standby table.

17. The policy handling system according to claim 14, wherein the policy retrieving section comprises a policy-approximation degree evaluating section configured to determine a degree of approximation between policies based on at least one of the triggering condition and operation to be executed, and to update the execution frequency of the policy determined to be abnormal and execution frequency of a policy determined by the policy approximation-degree evaluating section to be approximating the abnormal policy stored in the policy-chain-information storage unit.

18. A method for detecting an abnormity of a policy in a policy handling system for managing a management-targeted system based on at least two or more policies in each of which a triggering condition for triggering the policy and operation to be executed are associated with each other, the method comprising:
   a policy-operation-log retrieving section of a processor receiving a notification of a satisfied policy having a triggering condition which is satisfied and subsequently referring to a policy-operation-log storage unit which stores ID of a triggered policy and triggered time in association with each other, to acquire a triggered frequency of said satisfied first policy;
   a policy-execution-pattern analyzing section of the processor determining whether or not said satisfied policy is abnormal based on the acquired triggered frequency of said satisfied policy: and
   an operation execution section of the processor executing operation of said satisfied policy when said satisfied policy is determined normal; and stopping executing operation of said satisfied policy when said satisfied policy is determined abnormal.

19. A method for detecting an abnormity of a policy in a policy handling system for managing a management-targeted system based on at least two or more policies in each of which a triggering condition for triggering the policy and operation to be executed are associated with each other, the method comprising:
   a policy-operation-log retrieving section of a processor receiving a notification of a satisfied policy having a triggering condition which is satisfied and subsequently referring to a policy-operation-log storage unit which stores ID of a triggered policy and triggered time in association with each other, to acquire a triggered frequency of said satisfied policy;
   a policy-execution-pattern analyzing section of the processor determining whether or not said satisfied policy is abnormal based on the acquired triggered frequency of said satisfied policy;
   an operation execution section of the processor executing operation of said satisfied policy when said satisfied policy is determined normal; and
   an output unit outputting a notification that an abnormality occurs in said satisfied policy operation when said satisfied policy is determined abnormal.

20. The method for detecting an abnormity of a policy according to claim 18 or 19, wherein
   the acquiring the triggered frequency comprises acquiring, from the policy-operation-log storage unit a number of triggering times of said satisfied policy during a history acquisition period before receiving the notification, and
   the determining whether or not said satisfied policy is abnormal comprises determining that said satisfied policy is abnormal when the number of triggering times of said satisfied policy during the history acquisition period exceeds a predetermined threshold.

21. The method for detecting an abnormity of a policy according to claim 20, wherein the acquiring the triggered frequency comprises referring to a history-acquisition period storage unit which stores a policy and a history acquisition period in association with each other, and acquiring the history acquisition period of said satisfied policy.

22. The method for detecting an abnormity of a policy according to claim 21, further comprising:
   the processor calculating an average and a variance of at least one of a past triggered frequency and a triggering time interval, calculating the history acquisition period of said satisfied policy based on the calculated average and the variance, and storing the obtained history acquisition period in the history acquisition-period storage unit.

23. The method for detecting an abnormity of a policy according to claim 20, wherein the determining whether or not said satisfied policy is abnormal further comprises acquiring the threshold from a policy-triggering-count-threshold storage unit which stores a policy and a threshold in association with each other.

24. The method for detecting an abnormity of a policy according to claim 23, further comprising: the processor calculating an average and a variance of a number of triggering times of said satisfied policy during a specific period; calculating the threshold based on the calculated average and variance; and storing the threshold in the policy-triggering-count-threshold storage unit.

25. The method for detecting an abnormity of a policy according to claim 18 or 19, further comprising the processor determining a degree of approximation between policies based on at least one of the triggering condition and an operation to be executed,
   wherein the acquiring the triggered frequency comprises regarding an approximating policy, determined to be approximating said satisfied policy, as the same as said satisfied policy and acquiring, from the policy operation-log storage unit, a number of triggering times of the approximating policy.

26. The method for detecting an abnormality of a policy according to claim 18 or 19, further comprising, before the determining whether or not said satisfied policy is abnormal, the processor referring to a policy flag table, which stores a policy and an influence-degree flag indicating whether or not policy operation-abnormality determination processing needs to be performed for said satisfied policy.

27. A non-transitory computer readable medium encoded with a computer program on which a central processing unit (CPU) is run for managing a management-targeted system based on at least two or more policies in each of which a triggering condition for triggering the policy and operation to be executed are associated with each other, the program being configured to cause the CPU to perform the operations of:
   receiving a notification of a satisfied policy having a triggering condition which is satisfied, and subsequently referring to a policy-operation-log storage unit which stores ID of a triggered policy and triggered time in association with each other, to acquire a triggered frequency of said satisfied policy;

determining whether or not said satisfied policy is abnormal based on the acquired triggered frequency of said satisfied policy; and executing operation of said satisfied policy when said satisfied policy is determined normal; and stopping executing operation of said satisfied policy when said satisfied policy is determined abnormal.

28. A non-transitory computer readable medium encoded with a computer program on which a central processing unit (CPU) is run for managing a management-targeted system based on at least two or more policies in each of which a triggering condition for triggering the policy and operation to be executed are associated with each other, the program being configured to cause the CPU to perform the operations of:

receiving a notification of a satisfied policy having a triggering condition which is satisfied and subsequently referring to a policy-operation-log storage unit which stores ID of a triggered policy and triggered time in association with each other to acquire a triggered frequency;

determining whether or not said satisfied policy is abnormal based on the acquired triggered frequency of said satisfied policy;

executing operation of said satisfied policy when said satisfied policy is determined normal; and outputting a notification that an abnormality occurs in said satisfied policy operation when the said satisfied policy is determined abnormal.

29. The program according to claim 27 or 28, wherein the acquiring the triggered frequency comprises acquiring a the number of triggering times of the policy during a history acquisition period before receiving the notification, and the determining whether or not said satisfied policy is abnormal comprises determining that said satisfied policy is abnormal when the number of triggering times of said satisfied policy during the history acquisition period exceeds a predetermined threshold.

30. The program according to claim 29, wherein the acquiring the triggered frequency comprises referring to a history-acquisition-period storage unit which stores a policy and a history acquisition period in association with each other, and acquiring the history acquisition period of said satisfied policy.

31. The program according to claim 30, wherein the program is further configured to cause the CPU to perform: calculating an average and a variance of at least one of past triggered frequency and triggering time interval and calculating the history acquisition period based on the calculated average and the variance, and storing the obtained history acquisition period in the history-acquisition period storage unit.

32. The program according to claim 29, wherein the determining whether or not said satisfied policy is abnormal further comprises acquiring the threshold from a policy-triggering-count-threshold storage unit which stores a policy and a threshold in association with each other.

33. The program according to claim 32, wherein the program is further configured to cause the CPU to perform: calculating an average and a variance of a number of triggering times of said satisfied policy during a specific period, calculating the threshold based on the calculated average and variance, and storing the threshold in the policy-triggering-count-threshold storage unit.

34. The program according to claim 27 or 28, wherein the program is further configured to cause the CPU to perform: determining a degree of approximation between policies based on at least one of triggering condition and an operation to be executed, wherein the acquiring the triggered frequency comprises regarding an approximating policy, determined to be approximating said satisfied policy, as said satisfied policy and acquiring, from the policy-operation-log storage unit, a number of triggering times of the approximating policy.

35. The program according to claim 27 or 28, wherein the program is further configured to cause the CPU to perform: before determining whether said satisfied policy is abnormal or not, referring to a policy flag table which stores a policy and an influence-degree flag indicating whether or not the policy operation-abnormality determination processing needs to be performed for said satisfied policy.

* * * * *